United States Patent
Segre et al.

(10) Patent No.: US 9,774,739 B2
(45) Date of Patent: Sep. 26, 2017

(54) RESOURCE SHARING IN A PEER-TO-PEER NETWORK OF CONTACT CENTER NODES

(71) Applicant: Genesys Telecommunications Laboratories, Inc., Daly City, CA (US)

(72) Inventors: Paul Segre, Sonoma, CA (US); Gordon Bell, San Mateo, CA (US); Brian Bischoff, Raleigh, NC (US); Donald Huovinen, Jacksonville, FL (US); Herbert Willi Artur Ristock, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 365 days.

(21) Appl. No.: 14/221,202

(22) Filed: Mar. 20, 2014

(65) Prior Publication Data

US 2015/0271331 A1     Sep. 24, 2015

(51) Int. Cl.
*G06F 15/173*     (2006.01)
*H04M 3/523*     (2006.01)
*H04L 29/08*     (2006.01)

(52) U.S. Cl.
CPC ...... *H04M 3/5232* (2013.01); *H04L 67/1002* (2013.01); *H04M 3/5237* (2013.01)

(58) Field of Classification Search
CPC . H04L 67/101; H04L 67/104; H04L 67/1002; H04L 43/04; H04M 3/523
See application file for complete search history.

(56) References Cited

U.S. PATENT DOCUMENTS 6,141,759 A    10/2000   Braddy
7,403,607 B2    7/2008   Hession et al.
(Continued)

OTHER PUBLICATIONS

Androutsellis-Theotokis, Stephanos et al., A Survey of Peer-to-Peer Content Distribution Technologies, ACM Computing Surveys, vol. 36, No. 4, Dec. 2004, pp. 335-371.

(Continued)

*Primary Examiner* — Yves Dalencourt
(74) *Attorney, Agent, or Firm* — Lewis Roca Rothgerber Christie LLP

(57) ABSTRACT

A system and method for local survivability in a distributed contact center environment has a first processor in a first contact center node receiving a first request for interaction. The first processor transmits a first message to a second contact center node in response to the request for interaction. The first message is configured to invoke a first resource associated with the second contact center node for handling the interaction via the first resource. The first processor monitors connection with the second contact center node. The first processor receives a second request for interaction, and further determines lack of connection with the second contact center node. In response to determining lack of connection with the second contact center node, the first processor refrains from transmitting a second message to the second contact center node. According to one embodiment, the second message is for invoking a second resource associated with the second contact center node for handling the interaction via the second resource.

16 Claims, 22 Drawing Sheets

(56) References Cited

U.S. PATENT DOCUMENTS

| | | | |
|---|---|---|---|
| 7,475,421 B2 | 1/2009 | Abdo et al. | |
| 7,865,616 B2* | 1/2011 | Saffre | H04L 67/16 |
| | | | 709/217 |
| 2004/0228279 A1* | 11/2004 | Midtun | H04L 69/329 |
| | | | 370/236 |
| 2007/0174660 A1 | 7/2007 | Peddada | |
| 2007/0299680 A1 | 12/2007 | Fama et al. | |
| 2009/0316687 A1* | 12/2009 | Kruppa | H04M 3/51 |
| | | | 370/352 |
| 2010/0172485 A1 | 7/2010 | Bourke et al. | |
| 2012/0066394 A1 | 3/2012 | Revanuru et al. | |
| 2012/0167112 A1* | 6/2012 | Harris | G06F 9/5072 |
| | | | 718/104 |
| 2012/0266014 A1 | 10/2012 | Doeden et al. | |
| 2012/0321054 A1 | 12/2012 | Emerick | |
| 2013/0083908 A1 | 4/2013 | Kolesov et al. | |
| 2013/0315382 A1 | 11/2013 | Liberman et al. | |
| 2014/0075009 A1* | 3/2014 | Kovalenko | H04M 3/5237 |
| | | | 709/224 |
| 2014/0181817 A1* | 6/2014 | Muller | G06F 9/5022 |
| | | | 718/1 |
| 2015/0271249 A1 | 9/2015 | Segre et al. | |

OTHER PUBLICATIONS

International Search Report and Written Opinion for PCT/US2015/021886, dated Jun. 29, 2015, 13 pages.

* cited by examiner

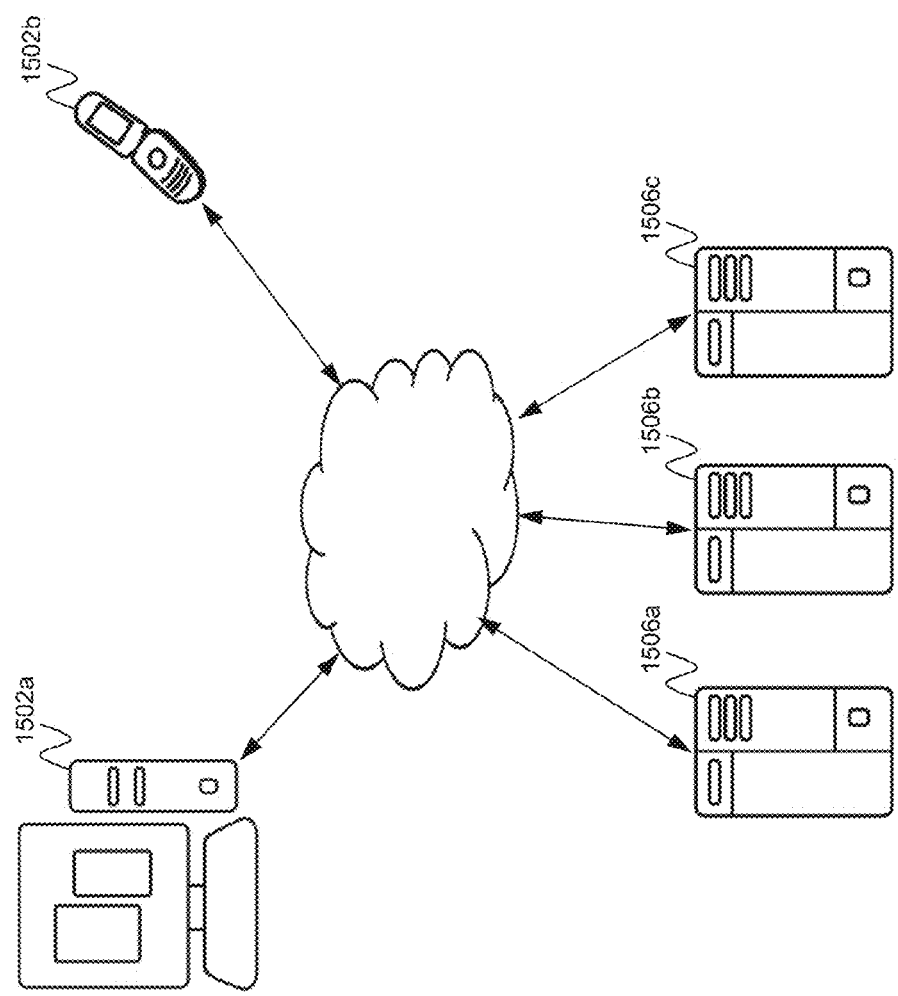

RESOURCE SHARING IN A PEER-TO-PEER NETWORK OF CONTACT CENTER NODES

BACKGROUND

As cloud and distributed computing models become more common-place, there is great potential to apply these patterns in the contact center space. A contact center utilizes different resources to accomplish various support tasks. Such resources include contact center agents with various specialties or skills, computing and voice resources for handling telephony calls, emails, and other interactions, and other information and communications technology (ICT) conventional in the art.

A typical contact center deployment for a large enterprise includes one or more data centers with several branch sites distributed over different geographic locations. The main contact center resources including computing resources and databases, are hosted at the data center. Each branch site is coupled to the data center over a data communication network, and includes local resources such as, for example, local media resources, local PBX, web servers, and the like.

There are situations that cause local branches to lose communication with the data center. In those situations, it is desirable for the local branches to survive locally and continue to provide contact center services without access to resources located at the data center.

In other situations, the data center and/or local branches may be overloaded with too many requests. In this scenario, it may be desirable to obtain additional capacity from other contact center sites if those other sites have excess capacity.

SUMMARY

According to one embodiment, the present invention is directed to a system and method for local survivability in a distributed contact center environment. A first processor in a first contact center node receives a first request for interaction. The first processor transmits a first message to a second contact center node in response to the request for interaction. The first message is configured to invoke a first resource associated with the second contact center node for handling the interaction via the first resource. The first processor monitors connection with the second contact center node. The first processor receives a second request for interaction, and further determines lack of connection with the second contact center node. In response to determining lack of connection with the second contact center node, the first processor refrains from transmitting a second message to the second contact center node. According to one embodiment, the second message is for invoking a second resource associated with the second contact center node for handling the interaction via the second resource.

According to one embodiment of the invention, the first or second resource is a media port of a media server associated with the second contact center node. The interaction may be a voice call, and the handling of the interaction may be playing media during the voice call.

According to one embodiment of the invention, the first or second message is a request for media service.

According to one embodiment of the invention, in response to determining lack of connection with the second contact center node, handling the interaction via a local resource provided by the first contact center node.

According to one embodiment of the invention, the first processor transmits, to a peer node coupled to the first node in a peer-to-peer network, a third message indicative of capacity of the local resource of the first contact center node. The third message may be for requesting additional capacity, and in response to the third message, the peer node may provide the requested additional capacity. The providing the additional capacity to the first contact center node may include handling a second interaction received by the first processor, by the peer node via a local resource at the peer node.

According to one embodiment of the invention, in response to determining lack of connection with the second contact center node, a contact center agent associated with the second contact center node is prompted to re-log into the first contact center node.

As a person of skill in the art should appreciate, embodiments of the present invention allow a contact center site to survive locally and provide contact center services without access to resources located at a central site. Contact center nodes are also coupled to one another in a peer-to-peer network which allow overloaded nodes to receive capacity from other nodes that have spare capacity. In this manner, effective use of resources may be made across contact center sites and deployments. The sharing of resources with an overloaded contact center also helps the overloaded contact center maintain and/or improve its service levels. The sharing of resources may be within the same (distributed) contact center, across distinct contact centers, and/or the like.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 17E is a block diagram of a network environment including several computing devices according to an embodiment of the present invention.

DETAILED DESCRIPTION

Figure 1:
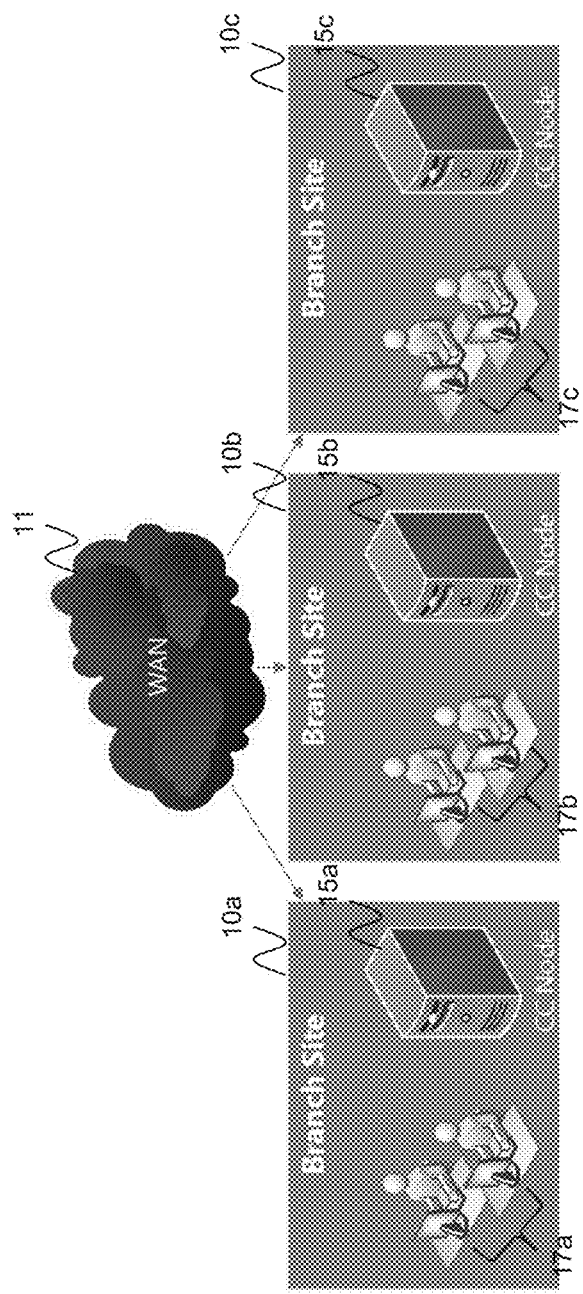
FIG. 1 is a block diagram of a distributed contact center system according to one embodiment of the invention.

In general terms, embodiments of the present invention are directed to a system and method for local survivability and resource sharing in a distributed contact center environment. In this regard, a contact center node is coupled to another contact center node over a distributed network architecture such as, for example, a peer-to-peer (P2P) network. A contact center node may be described as a computer node having hardware, software, and network capabilities to provide contact center services for end customers as well as communicate with other computer nodes over the P2P network. According to one embodiment, each contact center node is hosted at a contact center site that may function autonomously from other contact center sites. The contact center site may refer to a physical geographic location including the various components of the contact center node as well as other contact center equipment, or a virtual location where the physical contact center equipment may be distributed over various physical locations but that work together to form the virtual contact center site. According to this embodiment, each contact center site has (or is associated with) contact center resources such as agents, media resources, computing resources, and the like, that may be used for handling requests arriving at the contact center site. A typical request may be a request for interaction by a contact center customer. In the various embodiments, the term interaction is used generally to refer to any real-time and non-real time interaction that uses any communication channel including, without limitation telephony calls (PSTN, VoIP, mobile calls), emails, vmails (voice mail through email), web collaboration, video, chat, screen-sharing, text messages, social media messages, web real-time communication (e.g. WebRTC calls), and the like.

According to one embodiment, one or more of the contact center sites may be coupled to a central site such as, for example, a central data center, hosting one or more of the contact center resources. When present, the central site may work in conjunction with the associated contact center sites to process an interaction for the contact center. According to one embodiment, contact center services may still be provided despite loss of connection to the central site. The loss of connection may be due to failure in a communication link to the central site and/or failure of one or more nodes hosted by the central site. Other reasons might be power outage, human error (e.g. misconfiguration), and the like.

According to one embodiment, the various contact center nodes share resource capacity information with each other so that overloaded contact center nodes may utilize resources of contact center nodes with spare capacity. In some instances, the nodes sharing the resources may be associated with different entities, such as, for example, different contact centers, or different deployments (e.g. a premise deployment sharing resources with a cloud deployment). In this manner, effective use of resources may be made amongst the various contact center nodes.

FIG. 1 is a block diagram of a distributed contact center system according to one embodiment of the invention. The system includes various contact center (CC) sites (also simply referred to as contact centers) 10a-10c (collectively referenced as 10) coupled to each other over a data communications network 11 such as, for example, a wide area network. The wide area network may be a public wide area network such as the Internet, a private wide area network, or any other network conventional in the art, such as, for example, an MPLS (multi-protocol level switching) network. Each CC site 10 may be an in-house facility to a business or corporation for serving the enterprise in performing the functions of sales and service relative to the products and services available through the enterprise. In another aspect, the CC site may be that of a third-party providing CC services for one or more enterprises.

According to one exemplary embodiment, each CC site includes resources (e.g. personnel, computers, telecommunication equipment, and the like) to enable delivery of services via telephone or other communication mechanisms. Such services may vary depending on the type of contact center, and may include customer service (e.g. help desk, emergency response, order taking, etc.), telemarketing, and the like. The CC sites may provide CC services for a single enterprise or for different enterprises. In either case, according to one embodiment, each CC site 10 functions autonomously from the other CC sites without a central data center. In this regard, each CC site 10 maintains its own group of agents 17a-17c (collectively referenced as 17) and maintains other resources for handling interactions with customers of the enterprise for which contact center services are being provided. Although the group of agents maintained by a CC site depends on the preference of the agents, the agents may also in some situations move from one site to another depending on, for example, failure of a branch or other reasons such as, for example, depending on tasks scheduled for the agent.

According to one embodiment, each CC site 10 hosts a CC node 15a-15c (collectively referenced as 15) configured with one or more CC resources. The CC node 15 may be a computing device including a processor and memory, such as, for example, a computing device described with respect to FIGS. 17A-17E. The CC node 15 may also be configured to hardware and software for providing media connectivity. According to one embodiment, the CC nodes 15 are coupled to each other over the wide area network utilizing a peer-to-peer (P2P) network architecture. In this regard, the interconnected nodes 15 (also referred to as "peer nodes") share data and resources with each other without such data and resources passing through a centralized server. According to one embodiment, a node consuming resources from another node may, at a different time, be a node providing resources to that other node. According to another embodiment, a node consuming resources to another node does not share its own resources with that other node.

Other distributed network architectures may be used instead of the P2P network architecture. For example, an architecture utilizing a client-server model may be used instead of the P2P architecture, where the clients (nodes) are connected to the central server (central controller) and the nodes are not aware of each other.

According to one embodiment, each CC node 15 internally measures its resource capacity and identifies a state of such capacity. One of three capacity states may be identified for a particular resource: 1) nominal; 2) spare; and 3) overload.

Figure 2:
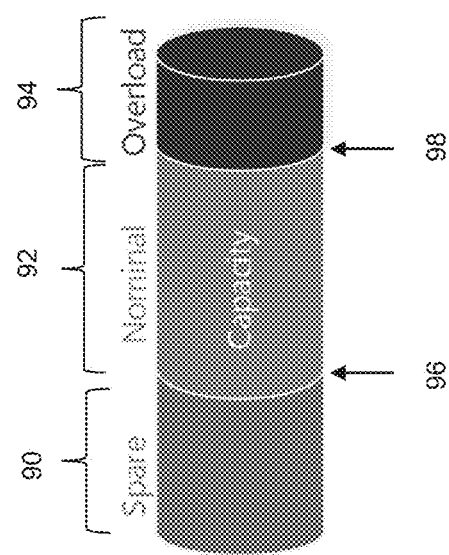
FIG. 2 is a conceptual layout diagram of various capacity states of a particular contact center resource.

FIG. 2 is a conceptual layout diagram of various capacity states of a particular contact center resource. The capacity states include a spare state 90, nominal state 92, and overload state 94. As the CC node receives requests, including requests for different types of interactions, the requests consume the various resources within the CC node. If consumption of a particular resource is within a pre-configured threshold, the state of the resource capacity is deemed to be in the nominal state 92. According to one embodiment, nominal capacity is defined between a lower threshold 96 and an upper threshold 98. As long as usage/consumption of the particular resource is within the lower and upper thresholds, the current level of resource consumption is deemed to be nominal; hence, the resource is deemed to have nominal capacity.

When consumption of the particular resource is above the upper threshold 98, the state of the resource capacity transitions from the nominal to the overload state 94. At this point, the CC node 15 may request additional capacity from other CC nodes in the network.

Similarly, as a CC node 15 becomes less active due to fewer requests to the node, consumption of the particular resource may fall below the lower threshold 96. In this case, the capacity state of the resource transitions from the nominal 92 to the spare state 90. At this point, the CC node may publish its additional capacity to allow CC nodes that have identified themselves to be in overload state to re-assign requests to the node with spare capacity.

Figure 3:
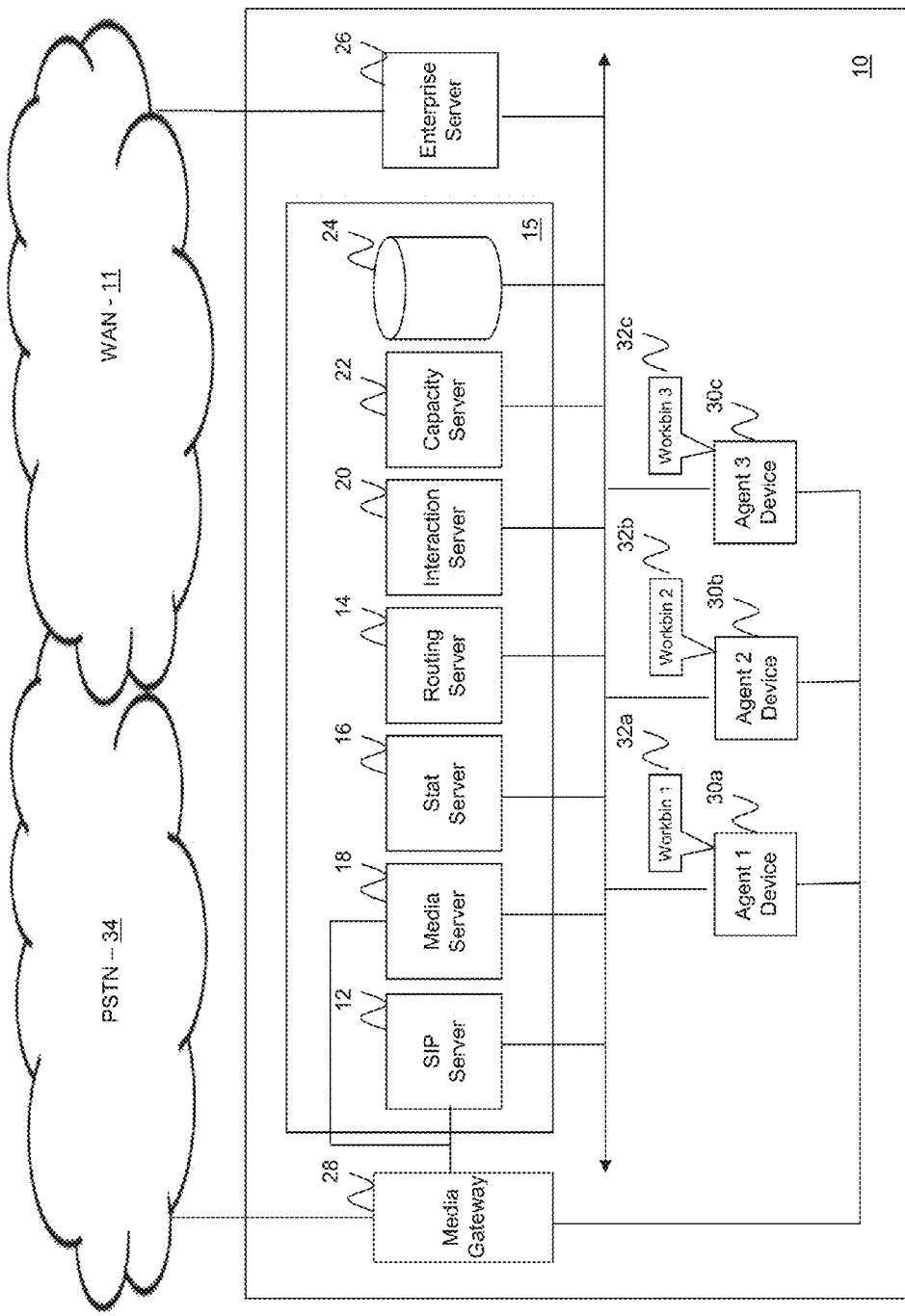
FIG. 3 is a more detailed schematic block diagram of a contact center (CC) site hosting a CC node according to one embodiment of the invention.

FIG. 3 is a more detailed schematic block diagram of a CC node 15 according to one embodiment of the invention. The CC node includes various contact center servers including, for example, a SIP server 12, routing server 14, statistics server 16, media server 18, interaction server 20, capacity server 22, and the like. According to one embodiment, the servers 12-22 are implemented as software components that are deployed in the CC node 15. Although the various servers are described as separate functional units, a person of skill in the art will recognize that the functionality of the various servers may be combined or integrated into a single server, or further subdivided into other separate functional units without departing from the spirit of the invention.

According to one embodiment, the CC node 15 also hosts a mass storage device 24 which may take form of a hard disk or disk array as is conventional in the art. According to one exemplary embodiment of the invention, such as when the CC node is hosted by a central data center, the mass storage device 24 stores one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and/or the like. According to one embodiment, some of the data (e.g. customer profile data) may be provided by a third party database such as, for example, a third party customer relations management (CRM) database. According to the latter embodiment, the central data center may be deemed to be another node/site but with functionality of a central data center. The third party database may be provided, for example, by an external service. The third party database may also be incorporated into the contact center core functions as an enhancement to those core functions.

According to one embodiment, customers, potential customers, or other end users (collectively referred to as customers) desiring to receive services from the contact center may initiate inbound contact to the contact center via their end user devices (not shown). Each of the end user devices may be a communication device conventional in the art, such as, for example, a telephone, wireless phone, smart phone, personal computer, electronic tablet, and/or the like. Users operating the end user devices may initiate, manage, and respond to telephone calls, emails, chats, text messaging, web-browsing sessions, and other multi-media interactions.

Inbound and outbound interactions from and to the end users devices may traverse a telephone, cellular, and/or data communication network depending on the type of device that is being used and the type of media channel that is invoked. For example, the communications network may include a private or public switched telephone network (PSTN) 34, the wide area network 11, and/or the like. The communications network may also include a wireless carrier network including a code division multiple access (CDMA) network, global system for mobile communications (GSM) network, and/or any 3G or 4G network conventional in the art.

According to one exemplary embodiment, the contact center includes a media gateway 28 coupled to the PSTN network 34 for receiving and transmitting telephony calls between end users and the contact center. The media gateway 28 may take the form of an automatic call distributor, a private branch exchange (PBX), an IP-based software switch, and/or any other switch or gateway configured to receive Internet-sourced calls and/or telephone network-sourced calls. According to one exemplary embodiment of the invention, the media gateway 28 is coupled to a SIP (Session Initiation Protocol) server 12 which may, for example, serve as an adapter or interface between the media gateway and the remainder of the routing, monitoring, and other call-handling components of the contact center. Although SIP is used as an example protocol to which the server 12 adheres, a person of skill in the art will understand that any other protocol other than SIP may be used for processing telephony calls between customers and the contact center. According to one embodiment, the SIP server 12 in various nodes are coupled to one another over data links to allow, for example, call metadata to be passed from one SIP server to another in the event a call arriving at one node is to be passed to another node.

According to one embodiment, interactions other than telephony interactions are received by an enterprise server 26 and forwarded to the interaction server 20 for further handling. The other types of interactions may include, for example, email, vmail (voice mail through email), chat, video, text-messaging, web, social media, co-browsing, web real time communication (WebRTC), and the like. In this regard, the enterprise server 26 may take the form of an email server, web server, and/or the like. According to one embodiment video and WebRCTC calls are handled by the SIP server 12 instead of the interaction server 20. Also, according to one embodiment, a central interaction server 20 handles the various non-telephony interactions for the contact center. Multiple interactions servers may also be deployed in other embodiments. The multiple interaction servers may allow handling of various non-telephony interactions concurrently. The multiple interactions servers may also serve as backup servers that are passive during normal operation, but become active when the central interaction server is down. The same may apply for other components of the CC node, such as, for example, the routing server 14.

The routing server 14 may be configured to work with the SIP servers 12 and/or interaction server 20 for routing interactions to a contact center target based on a routing strategy associated with a particular route point (e.g. a called number). Depending on the type of routing strategy configured for the route point, different options, voice treatments, and routing is performed for the interaction.

The media server 18 may be configured to identify parameters (e.g. available media ports on the media server) for establishing voice conversations between a customer and a contact center target. The media server 18 is also configured to deliver media to customers and/or agents. For example, the media server 18 may be invoked to provide initial greeting messages to a calling customer, and interactive voice response (IVR) treatment to obtain basic customer information (e.g. identification information, reason for the call, etc.). If the customer or agent is placed on hold, the media server 18 may be invoked to play music for the holding customer or agent. In another example, if a conversation between the customer and agent is to be recorded, the call may traverse the media server so that the customer and agent may engage in a three way conversation with the media server, and the media server may record the conversation and store the recorded conversation in a database.

The statistics server 16 may be configured to gather, store, analyze, and/or deliver data regarding various resources of the contact center. Such data may include data regarding agent availability, average handling time, average hold time, total talk time, after work time, average speed of answer, service level statistics, abandonment rate, patience rate, and the like. The delivery of statistics data may be to subscribing clients, such as, for example, delivery of agent status to the routing server 14, and real-time statistics to reporting applications.

The capacity server 22 may be configured to monitor the capacity of various resources of the CC site and provide the capacity information to, for example, one or more other nodes of the P2P network. Depending on the capacity state of the various resources, the capacity server 22 may also be configured to request for additional capacity if one or more resources are overloaded, or provide additional capacity if there is spare capacity. The capacity server 22 may be configured to keep track of the resources being shared with others so that it may charge for usage of the resources. In this regard, conventional billing and/or accounting functionality may be included in the capacity server. Although the capacity server 22 is described as a functionally separate unit, a person of skill in the art should recognize that functions of the capacity server may be performed by other servers such as, for example, the routing server 14 or another resource manager (not shown) that may be configured to control occupancy of, for example, the media servers.

The CC node may include other servers as will be conventional in the art. For example, the CC node may include a configuration server for configuring the various servers and other aspects of contact center functionality as will be appreciated by a person of skill in the art. The CC node may also include one or more reporting servers configured to provide real-time reporting based on statistics data provided by the statistics server 16.

According to one embodiment, a telephony call is received by the media gateway 28 and the SIP server 12 is invoked for further handling. The SIP server 12 invokes the routing server 14 (e.g. by sending an event message) for retrieving a routing strategy for routing the call to an appropriate target. If the call is to be routed to a contact center agent, the routing server 14 identifies an appropriate agent for routing the call. The selection of an appropriate agent may be based, for example, on a routing strategy employed by the routing server 14, and further based on information about agent availability, skills, and other routing parameters provided, for example, by the statistics server 16.

The routing server 14 signals the SIP server 12 with information on the agent to which the call is to be routed. In this regard, the SIP server 12 transmits one or more SIP messages to establish a connection between the customer end device and an agent device 30a-30c (collectively referenced as 30). Collected information in the mass storage device 24 about the caller and/or the caller's historical information may also be provided to the agent device for aiding the agent in better servicing the call. In this regard, each agent device 30 may include a telephone adapted for regular telephone calls, VoIP calls, and the like. The agent device 30 may also include a computer for communicating with one or more servers of the contact center and performing data processing associated with contact center operations, and for interfacing with customers via voice and other multimedia communication mechanisms.

According to one embodiment, if there are no available agents to handle the call, the media server 18 may be invoked for playing different types of media (e.g. music) while the call is put on hold. The media server 18 may also be configured to provide messages indicative of how long the customer has to wait before an agent becomes available to handle the call. According to one embodiment, agents at other CC sites may be invoked to handle the call if there are no available agents at the current CC site.

According to one exemplary embodiment of the invention, the routing server 14 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may be pushed to the agent, or may appear in the agent's workbin 32a-32c (collectively referenced as 32) as a task to be completed by the agent. The agent's workbin may be implemented via any data structure conventional in the art, such as, for example, a linked list, array, and/or the like. The workbin may be maintained, for example, in buffer memory of each agent device 30.

Figure 4:
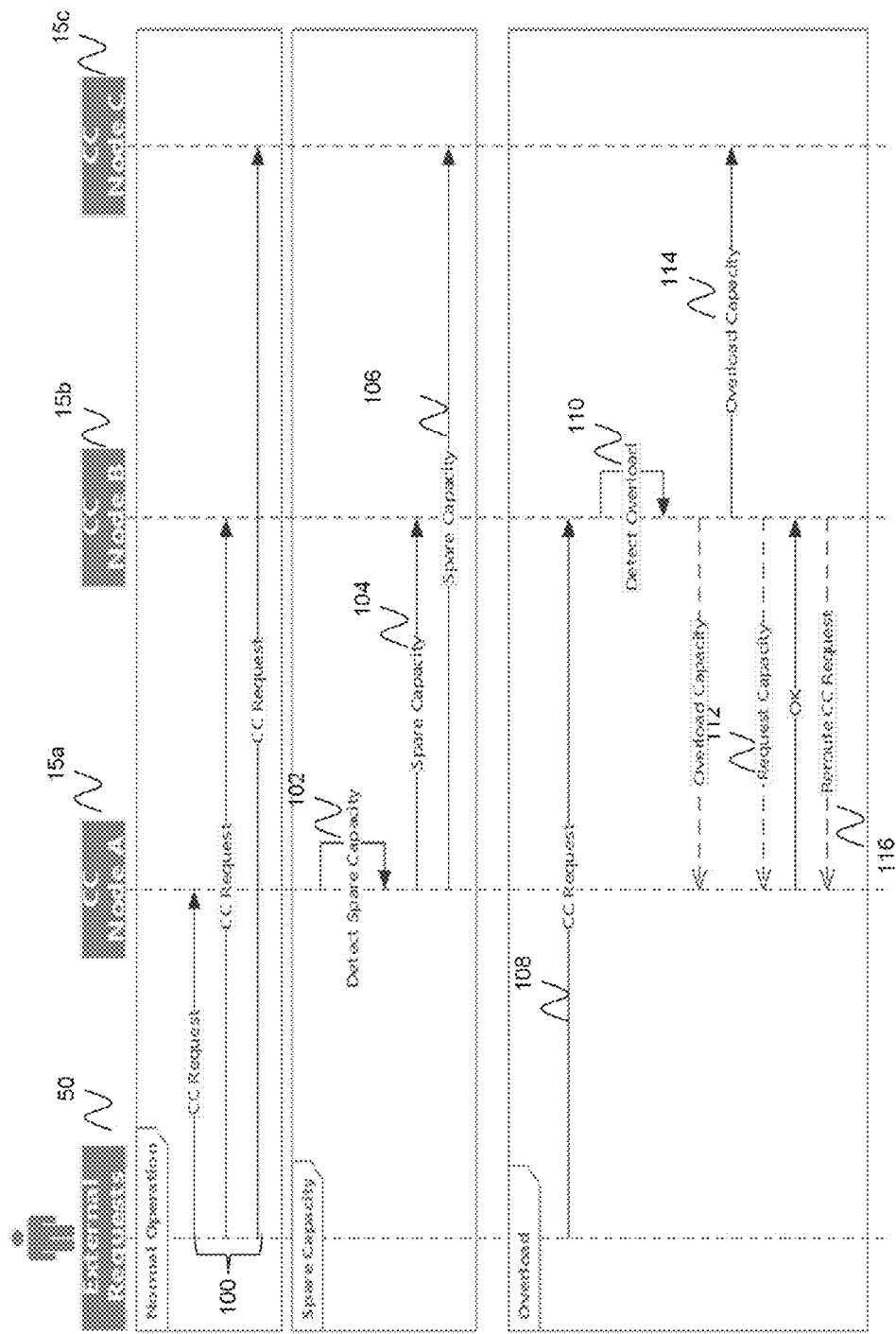
FIG. 4 is a messaging diagram of exemplary messages exchanged among CC nodes as CC node A reaches spare capacity and CC node B reaches an overload capacity according to one embodiment of the invention.

FIG. 4 is a messaging diagram of exemplary messages exchanged among the CC nodes 15 according to one embodiment of the invention. In the diagram of FIG. 4, messages are exchanged as CC node A 15a reaches spare capacity and CC node B 15b reaches an overload situation with respect to one or more resources for which capacity states are being monitored. Any one of various well known messaging protocols may be used for exchanging messages over the wide area network.

During normal operation, requests (e.g. telephone calls, emails, and other interactions) from different external sources (e.g. customers) 50 are received in acts 100 by a corresponding node 15a, 15b, 15c. In a typical multi-site contact center environment, a customer does not generally pick a particular site to which the call is to be initially sent. Instead, a central logic such as, for example, an SCP (service control point) determines the site to which to forward the call.

In act 102, CC node A 15a detects spare capacity for one or more resources, and in acts 104 and 105, CC node A 15a sends a spare capacity message to CC nodes B and C 15b, 15c. The spare capacity message may identify, for example the type of spare capacity that CC node A 15a can provide. For example, if node A 15a has spare agents, the specific types of skills associated with the spare agents may be provided along with the spare capacity message.

In act 108, CC node B 15b receives another contact center request, and in act 110, CC node B detects an overloaded state for the resource needed to handle the new request. Given that CC node A 15a has signaled that it has spare capacity, CC node B 15b transmits a request for capacity in act 112. The request for capacity may identify, for example the type of capacity that is requested. For example, if the requested capacity is for an agent with specific types of skills, the requested skills are identified in the request message. Assuming that CC node A 15a still has spare capacity, the node provides an OK signal in act 114, and in act 116, CC node B reroutes the CC request to CC node A 15a for handling. The rerouting of a voice call, for example, may invoke the SIP servers in both nodes for exchanging SIP messages with one another. According to one embodiment, such "borrowing" of server type spare may call for CC node A to have connectivity to resources of CC node B. For example, in one embodiment, CC node A executes the routing strategy of CC node B, and/or calculates statistics for CC node B.

According to one embodiment, the capacity server at CC node A and/or CC node B may be configured with logic to keep track of the amount of resources being borrowed by CC node B from CC node A, for then billing CC node B for use of such resources.

As an overloaded CC node redistributes requests to other nodes, it will eventually settle back to a nominal capacity state at which point it releases the borrowed resources. According to one embodiment, the borrowing and/or release of resources may be contract based. For example, a CC node may borrow resources for a certain time period and pay for such resources regardless of actual use of the resources, and when the time period expires, the borrowed resources are automatically released.

According to one embodiment, a rerouting or transfer of a particular request utilizes the standard protocols associated with it. For example, for IVR and voice call interactions, SIP transfer mechanisms may be employed to transfer the interaction from one CC node to another. For example, the transfer may be effectuated via REFER or re-INVITE SIP messages. In addition, each CC node may include properly configured edge devices to enable the successful transfer of voice traffic between contact center sites. Such an edge device may be, for example, a conventional session border controller. Other interactions such as email and social engagements may utilize protocols such as, for example, HTTP/REST, IMAP, POP3, SMTP, XMPP, or any other protocol conventional in the art, to send requests associated with such interactions between the nodes.

According to one embodiment, the transfer or rerouting of requests from one CC node to another includes transferring data related to the interaction. Such data may be, for example, data on the customer and information on the customer's past interactions which may be maintained in the mass storage device 24 hosted by the a particular CC node. The transfer of data may entail using JSON (JavaScript Object Notation) with an HTTP request. In one embodiment, data may be shared between the nodes via database replication. According to one embodiment, Cassandra data nodes are used to store and share data. According to one embodiment proprietary protocols, such as, for example, Genesys ISCC (Inter-Site Call Contro) may also be used to transfer data directly between SIP servers.

Figure 5:
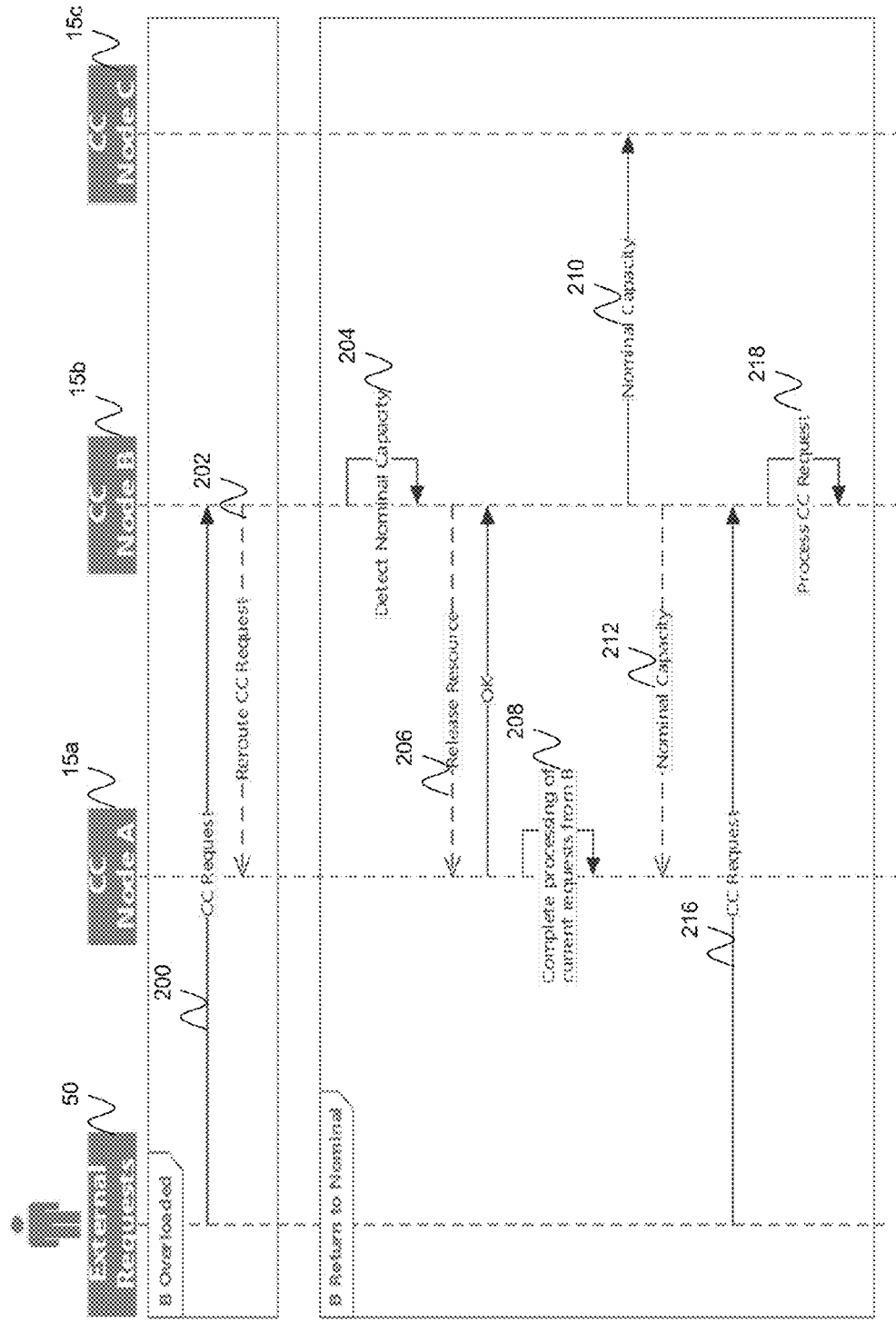
FIG. 5 is a messaging diagram of exemplary messages exchanged among the CC nodes as CC node B transitions from an overload state to a nominal state with respect to a particular resource.

FIG. 5 is a messaging diagram of exemplary messages exchanged among the CC nodes 15 as CC node B 15b transitions from an overload state to a nominal state with respect to a particular resource. While CC node B 15b is still in an overloaded state, it receives a CC request in act 200. In act 202, CC node B 15b reroutes the request to CC node A 15a by transmitting, for example, a SIP REFER or re-INVITE message.

In act 204, CC node B 15b detects nominal capacity for the overloaded CC resource, and in act 206, CC node B transmits a message to CC node A 15a to release the resource used by CC node A in handling the rerouted requests from CC node B.

In act 208, CC node A 15a completes processing of current requests from CC node B, if any.

In acts 210 and 213, CC node B 15b informs the other nodes 15a, 15b of the nominal capacity state of its resources.

In act 216, CC node B 15b receives a new CC request. Assuming that CC node B is still functioning in its nominal capacity with respect to the resource to be used to handle the new request, the CC node B handles the request using the resource in its nominal capacity in act 218.

Referring to the scenario of CC node A 15a providing its spare capacity to handle requests forwarded by overloaded CC node B 15b, CC node A continues to receive its own CC requests in addition to requests forwarded by CC node B. According to one embodiment, CC node 15a reclaims its resources if its own requirements consume the spare capacity it has been sharing. According to one embodiment, the reclaiming may require approval by the current CC node using the resource.

Figure 6:
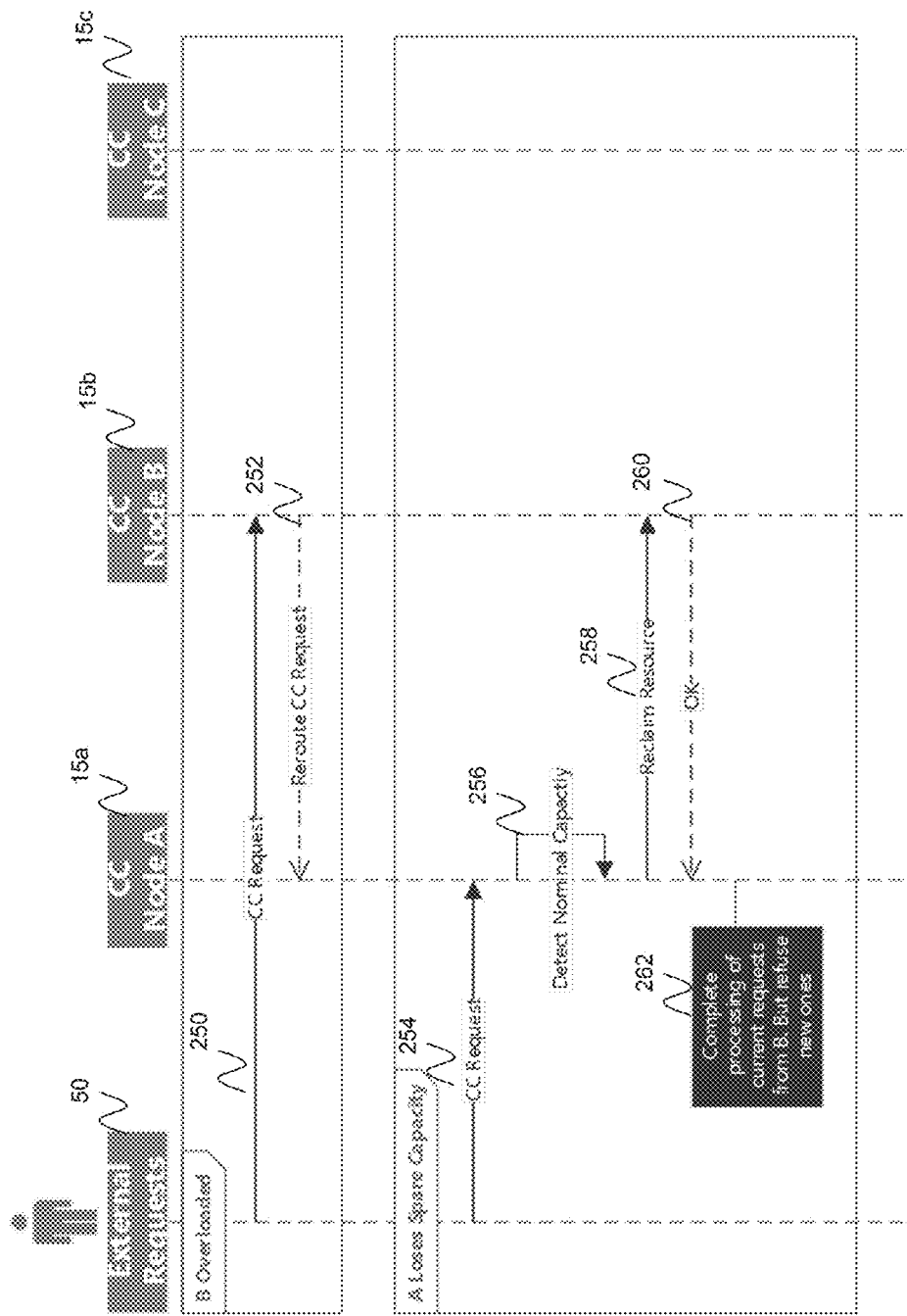
FIG. 6 is a messaging diagram of exemplary messages exchanged among the CC nodes as CC node A reclaims the spare capacity it has been sharing with CC node B, according to one embodiment of the invention.

FIG. 6 is a messaging diagram of exemplary messages exchanged among the CC nodes as CC node A 15a reclaims the spare capacity it has been sharing with CC node B 15b, according to one embodiment of the invention.

In acts 250 and 252, overloaded CC node B 15b receives a CC request and reroutes the request to CC node A 15a with spare capacity.

In act 254, CC node A 15a receives a new CC request from one of the external sources 50.

In act 256, CC node A 15a detects that it has transitioned from a spare capacity state to a nominal capacity state, and in act 258, transmits a message to CC node B to reclaim the shared capacity. According to one embodiment, CC node A may transition from spare capacity state to nominal capacity state if consumption of the resource being monitored is above the lower threshold 96 (FIG. 2).

CC node B transmits an acknowledgment back to CC node A in act 260, and refrains from transmitting new interactions/requests to CC node A. If CC node B is still functioning in an overloaded state, CC node B may try to seek other peer nodes with spare capacity to which the new requests may be rerouted. According to one embodiment, if CC node A is under contract to continue providing it with its resources, CC node A may try to seek other peer nodes with spare capacity if its capacity state transitions from nominal to overload. This may be done by sending messages similar to messages discussed with respect to FIG. 4, but with one or more node nodes that have indicated they have spare capacity. If no other such nodes are available, CC node B (or node A) may handle the new requests according to one of various standard mechanisms, including, for example, putting the requests on hold until capacity becomes available, rerouting requests to secondary resources within CC node B that are not functioning in an overload state, and/or the like. In the latter example, if a particular resource (e.g. agent with a particular skill level) is identified as being the preferable resource in handling an external request, and the preferred resource is in an overloaded state, CC node B may be configured to expand the resource pool to include agents with lower skill levels (e g skill level 3) until the particular resource transitions back to its nominal capacity.

In act 262, CC node A reclaiming its spare capacity completes processing current requests from CC node B 15b, but refuses new ones.

As networks grow, publishing capacity messages and other events to all nodes may be non-optimal. According to one embodiment, instead of all nodes publishing events to all other others in the P2P network, one or more nodes are designated as a master node. In addition to functioning as a normal CC node, the master nodes may have the additional responsibility of distributing spare and overload capacity messages to the other participating nodes in the P2P network. Depending on the size of the network, multiple master nodes may be designated. In this manner, no single node may be overloaded with message distribution tasks.

According to one embodiment, master nodes may be configured with additional intelligence for the distribution of messages. The additional intelligence may include, for example, forecasting logic for forecasting consumption patterns based on historical events received from various nodes. For example, a node that is frequently changing from the nominal to spare capacity states may not be an ideal node to which to reassign requests. Also, before providing a spare media resource capacity to a peer node, the master node may be configured to calculate the additional network bandwidth consumption between the nodes and potential for voice quality degradation. The master node may also have intelligence to select from various nodes with spare capacity based on other attributes of the nodes, such as, for example, the geographic location of the nodes in relation to the geographic location of the node with the overload capacity. For example, a node with spare capacity that is local to the node with the overload capacity may be preferred to another node with spare capacity that is in a more distant geographic location. In yet another example, in the event of various nodes with overload capacities and a limited number of nodes with spare capacity, an overloaded node that is related to the node with the spare capacity (e.g. both nodes are part of the same enterprise, joined to the same data center, etc.) may be serviced before an overloaded node with no particular relation to the node with the spare capacity (e.g. a node associated with a different enterprise).

Figure 7:
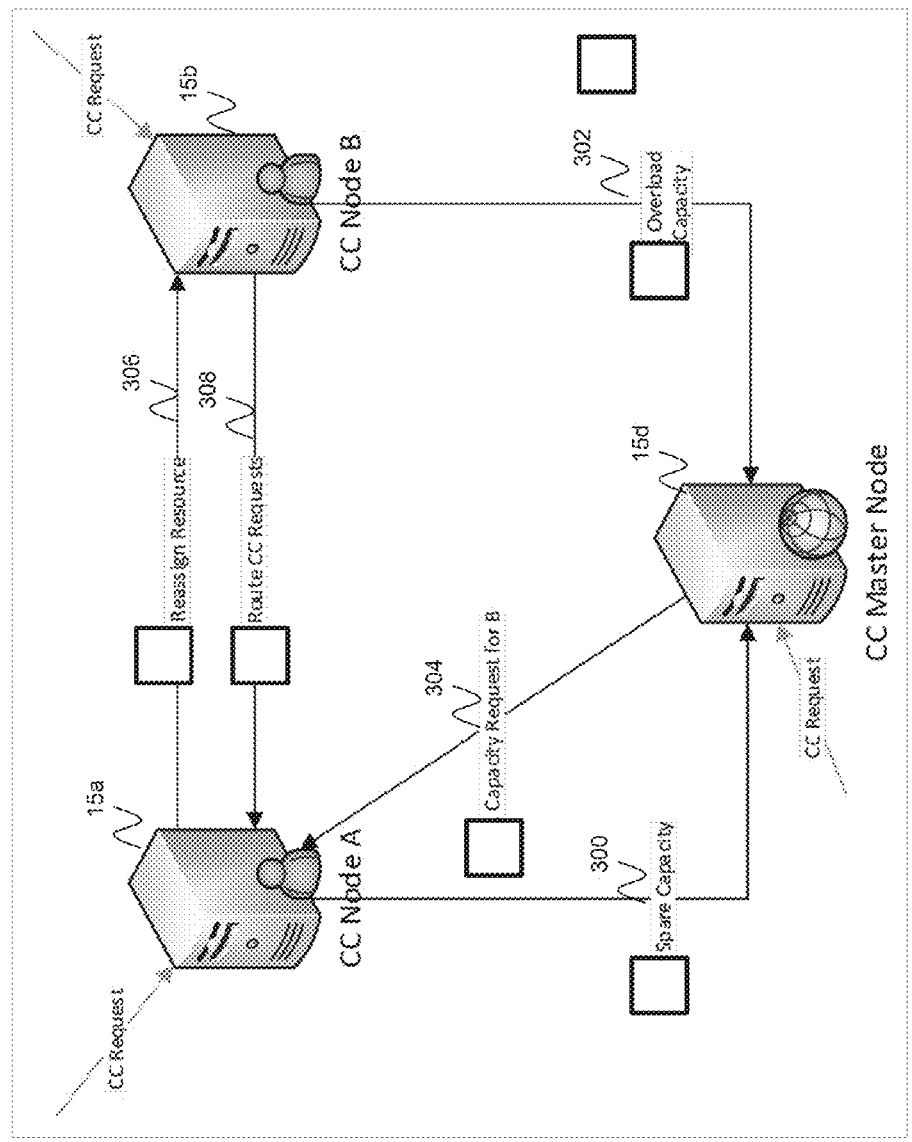
FIG. 7 is a schematic block diagram of a distributed contact center system including a master node according to one embodiment of the invention.

FIG. 7 is a schematic block diagram of a distributed contact center system including a master node 15d according to one embodiment of the invention. In the exemplary embodiment of FIG. 7, when CC node A detects spare capacity, it signals the master node 15d with a spare capacity message 300. The master node 15d also receives notifications 302 from other nodes, such as CC node B 15b. In this example, the message from CC node B indicates overload capacity. The message is interpreted by the CC master node 15d as a request for additional capacity. In one embodiment, the message from CC node B includes an express request for additional capacity.

The master node 15d forwards the request for additional capacity via message 304 to a node with spare capacity, such as, for example, CC node A 15a. According to one embodiment, the message 304 to the node with spare capacity includes identification of the node that is requesting the spare capacity, such as, for example, CC node B. CC node A then communicates directly (or indirectly via the master node) with CC node B to transmit a message 306 indicating that it will provide the additional capacity to CC node B. In response to the message, CC node B reroutes requests to CC node A via message(s) 308, as discussed above with respect to FIG. 4.

According to one embodiment, any CC node having sufficient CPU, memory, and network bandwidth may be a candidate to become a master node. In one embodiment, the selection of the master node is random or semi-random, and may or may not take into account the CPU, memory, and network bandwidth considerations. Master nodes may also be designated based on other factors such as, for example, geographic considerations. For example, a CC node in the middle of the U.S. may be designated as the master node to handle the message distribution task for peer nodes in the U.S. A CC node in the middle of Europe may be designated as another master node for handling message distribution tasks for peer nodes in Europe. Master nodes may be assigned and/or reassigned as the network of peer nodes grow.

According to one embodiment, when a CC node joins the P2P network, configuration settings of the CC node identify the IP address of the master node with which it should communicate. In another embodiment, the CC node joining the P2P network may first connect to a registration server (not shown) for receiving the IP address of the master node.

According to one embodiment, capacity monitoring and messaging responsibilities are handled by the capacity server 22 (FIG. 2) included in the CC node 15. If the CC node is also a master node, the capacity server 22 may be configured with additional logic for identifying nodes to which capacity requests are to be forwarded, based on, for example, forecast results and load balancing consideration.

According to one embodiment, the capacity server 22 is configured to monitor a set of resources that may be available for sharing with other nodes. In one example, the resources that are monitored and shared include contact center workers (e.g. agents) and media resources (e.g. for IVR interactions). Of course, other resources of the CC node may also be monitored and shared as will be appreciated by a person of skill in the art, such as, for example, computing power for automated responses (e.g. automatically responding to inbound emails), reporting resources (e.g. reporting server), and the like.

The capacity server 22 may be configured to monitor resources on any level of granularity as determined for example, based on the configuration settings of the CC node. For example, the capacity server 22 may be programmed to monitor agent resources based on agent skill sets (e.g. language, product specialization, business area), geographic location, and the like. Resource information that may be relatively static, such as information relating to agents, may be shared with the CC nodes (or at least the master nodes) using caching mechanisms conventional in the art. Also in a multi-tenancy environment where resources on, for example, a cloud environment, are shared by multiple contact centers, the monitoring of resources may be on a tenant-by-tenant basis.

In regards to media resources that may be shared with other CC nodes, according to one embodiment, such media resources are tied to the media server 18. The media server 18 may be invoked to handle a request that utilizes the IVR. According to one embodiment, the audio prompts for the IVR are provided by the media server 18. The media server 18 may also be invoked for other capabilities such as, for example, managing conferencing calls, providing call recording, playing music-on-hold, and the like.

Media ports of the media server 18 are consumed when providing media services. In order to determine the capacity state of the media ports, and hence, the capacity of the media server 18, the capacity server 22 may be configured to monitor, for example, an incoming rate of requests in embodiments where the requests are first routed to the IVR. An average time in the IVR may also be calculated. According to one embodiment, if the monitored incoming rate of requests and/or average time in the IVR exceeds a forecast incoming rate and/or time by a particular amount, the capacity server may be configured to conclude that media resources are in an overload state. On the other hand, if the monitored incoming rate of requests and/or average time in the IVR is below a forecast incoming rate and/or time by a particular amount, the capacity server may conclude that the media resources are in a spare state. If the monitored incoming rate of requests and/or average time in the IVR is equal to a forecast incoming rate and/or time within particular lower and upper boundaries, the media resources may be deemed to be in a nominal state.

CPU power is also consumed by the media server 18 in providing media services. According to one embodiment, a node may have multiple CPUs, each CPU dedicated to one or more services. For example, the media server 18 may have its own dedicated CPU. Consumption of the CPU power may be monitored and compared against an expected amount of CPU consumption for determining whether CPU capacity is nominal, spare, or overloaded. In the event that there is spare CPU power, the excess may be shared with other nodes that have indicated overloaded usage of their own CPU power for the same type of service.

According to one embodiment, CPU power may also be consumed due to performing automated processing in response to incoming requests, such as, for example, automatically transmitting response emails in response to incoming emails. In the event that one node has spare CPU capacity, such spare CPU capacity may be made available for use by a node with overloaded CPU usage. For example, requests that require automated processing may be automatically forwarded to a node with spare CPU capacity for processing by that node. In another embodiment, the node with overload CPU capacity may instantiate one of its servers for carrying out the automated processing, on the node with spare CPU capacity.

With respect to agents, the capacity server 22 may be configured to monitor a number of agents that are logged in and their usage. Usage may be based on the number of incoming requests, traffic load including required service time, and/or other Erlang measures, and the number of agents that are used, or to be used, to service the requests. For example, the contact center may determine that, based on a forecast of 10 calls coming in during a particular forecast period, 10 agents will be used to handle the calls, and thus staff the contact center with 10 agents. As long as the contact center experiences a call volume in the vicinity of 10 for the forecast time period (e.g. between 7 and 10 calls), the capacity server 22 may determine that the usage of agent resources is nominal. However, if the call volume falls below a particular number during the forecast period, such as, for example, below 7, the capacity server 22 may determine that there is excess agent capacity. If the call volume increases over a particular number during the forecast period, such as, for example, above 13, the capacity server 22 may determine that there is overloaded agent capacity. According to this example, if the actual call volume is 5 for the forecast time period, the capacity server 22 may determine that 2 agents are available for sharing. In another embodiment, capacity server 22 may determine that all 5 agents who are not busy handling calls are available for sharing.

The capacity server 22 may be configured to consider other factors that impact usage of agents, such as, for example, to whom the requests get routed (based on routing strategies), what skills are required for incoming requests compared to the skills of the agents available and the percentage of time in which agents are busy with calls, and the like. For example, if the current call volume of calls requiring skill set X is five, and there are currently five agents who are sitting idle not handling calls, the capacity server may still determine that the node is in an overload capacity for agents with skill set X if none of the five agents have the skill set X to handle the calls. The same may apply for calls requiring agents in a particular geographic location relative to the incoming call. As a person of skill will appreciate, the finer granularity of monitoring agent resources (e.g. factoring in skills), the better the sharing of appropriate agent resources.

According to one embodiment, the capacity server 22 may be configured with one or more forecasting models for forecasting different contact center metrics. Forecasting may also be done by other servers or systems, such as, for example, a workforce management system. According to one embodiment, forecasting models may also be used for forecasting expected interaction volume, agent occupancy rate, abandonment rate, average hold time, and/or other contact center metrics as will be understood by a person of skill in the art. The forecast information may be used to determine capacity states of one or more contact center resources, and/or for foreseeing when capacity of a particular resource may transition from one capacity state to another. For example, workforce management tools may provide trend information, predicting potential increases in requests (e.g. increased requests due to the holiday season). Scheduling information may also be included in the forecast. For example, knowing that additional agents of certain skills are scheduled to start at the beginning of the next shift may also influence the capacity state.

As person of skill in the art will appreciate, the forecasting models may be based on historical trends, statistical analyses, queue system theory, and the like, and may use well-known algorithms such as, for example, Erlang A, B, or C formulas.

As an example, forecasts may include making predictions relating to interaction volume, overhead, and staffing, for a particular forecast period. Forecasts may also be made in regards to usage of particular resources based on, for example, expected interaction volume. For example, occupancy of agents and/or media resources may be forecast based on predicted traffic to the contact center.

Forecasts may be based on parameters such as particular time periods of the day, certain days of the week, events, holidays, and the like. An event such as a sales promotion or marketing campaign, for example, may cause a predictable peak in interaction volume. Other events may cause shrinkage of available resources. For example, the forecast model may forecast a certain number of agents calling in sick on the day of the Super Bowl.

In a specific example, if 1000 calls are anticipated between 9:00 am and 9:15 am on Apr. 18, 2013, the predicted interaction volume for this period is 1000. The predicted staffing that is calculated to be needed to handle the 1000 calls may be, for example, 100 agents. However, if 10% of agents are predicted to not be available to handle the calls, the forecast staffing need may be 111 agents instead of 100. The prediction of 10% of the agents not being available may be due to agents taking vacations, calling in sick, or being engaged in other exceptions which may not be considered to be a work activity, such as, for example, training, meetings, breaks, meals, and other non-working states, resulting in shrinkage in the actual number of agents who are available to do the work.

In another example, forecasting models may indicate that inbound requests increase or decrease at particular time periods of the day, certain days of the week, during holidays, in response to specific events, and the like. For example, inbound requests may double on Mondays during 11:00 am and 2:00 pm. Such information may be used, for example, to decide whether spare capacity should be shared with another node or not. For example, although a CC node may operate in spare capacity prior to 11:00 am, the CC node may not make such capacity available to other CC nodes after 10:30 am in anticipation of increased requests at 11:00 am.

Setting up a network of multiple site contact centers is typically complex and time-consuming, and may require that all sites be integrated together in a fashion. To simplify the setup and configuration of the sites (or nodes), a federation model may be used where the P2P network is deemed to represent a federation and the CC nodes are deemed to be federation members.

According to one embodiment, a registrar node is configured to handle the discovery and authentication of each peer node joining the network. Any of the CC nodes 15 may be designated as the registrar node. For example, the registrar node may be an additional process running on a designated CC node 15, the master node 15d, or a separate node. According to one embodiment, the registrar node may be similar to a SIP Registrar, but may also include additional capabilities not provided by a SIP Registrar.

Figure 8A:
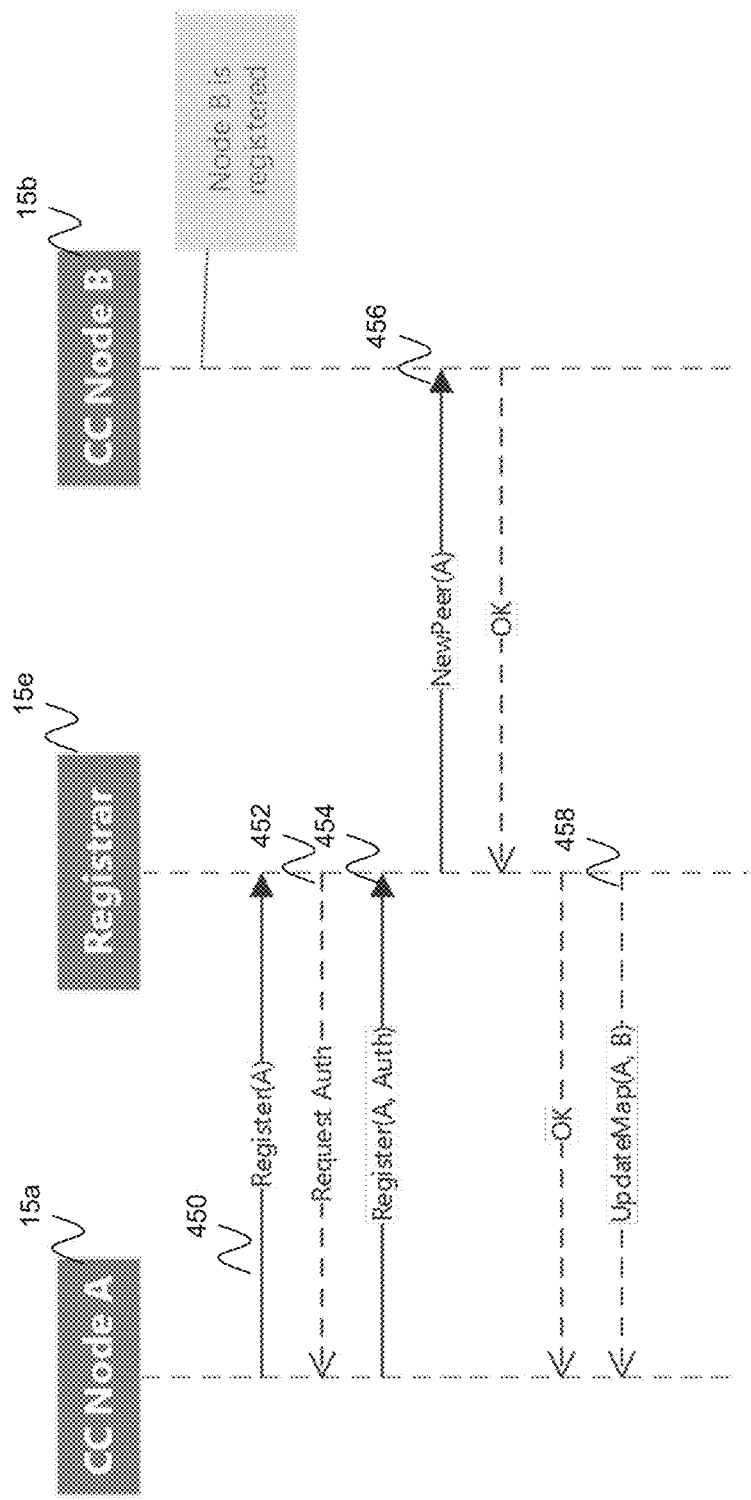
FIG. 8A is a messaging diagram of exemplary messages exchanged between CC nodes and a registrar node according to one embodiment of the invention.

FIG. 8A is a messaging diagram of exemplary messages exchanged between the CC nodes 15a, 15b and a registrar node 15e according to one embodiment of the invention. In this example, it is assumed that CC node B 15b is already part of the federation/P2P network and registered with the registrar node 15e.

In act 450, CC node A 15a desiring to join the P2P network transmits a registration request for registering with the registrar node 15e. According to one embodiment, the registrar node 15e is accessible to the various CC nodes via the HTTP protocol. According to one embodiment, the address of the registrar node 15e is configured into each node, such as, for example, in the configuration settings of each node. The address of the registrar node 15e may also be obtained based on domain name system (DNS) discovery capability.

In act 452, the registrar node initially rejects the request due to a lack of authorization, and requests authentication from CC node A 15a.

In act 454, CC node A 15a resends the registration request with proper authentication data, and the registrar node 15e proceeds to authenticate the CC node A based on the authentication data. The authentication may be via one of various typical authorization mechanisms conventional in the art including, for example, credentials and certificate based authentication. OAuth protocols conventional in the art may also be employed for the authentication.

Other nodes already registered within the federation will be notified of the new peer node. For example, a message may be transmitted to CC node B 15b in action 456 with information on the new peer node A.

In act 458, the registrar node 15e accepts the new node and sends to the node a map of the other nodes in the federation. According to one embodiment, the map includes a list of the registered nodes in the federation along with an IP address of each peer node. According to one embodiment, once authenticated, node A is a trusted node and may communicate directly with the other peer nodes in the map without being re-authenticated. In this regard, certificates may be issued to the trusted nodes to be used when communication with the peer nodes. The certificates may be renewed periodically, meaning that the trusted nodes may be re-authenticated periodically.

According to one embodiment, there are instances when one peer node may not wish to accept a new node into the federation. This may happen, for example, in a cross-enterprise use case.

Figure 8B:
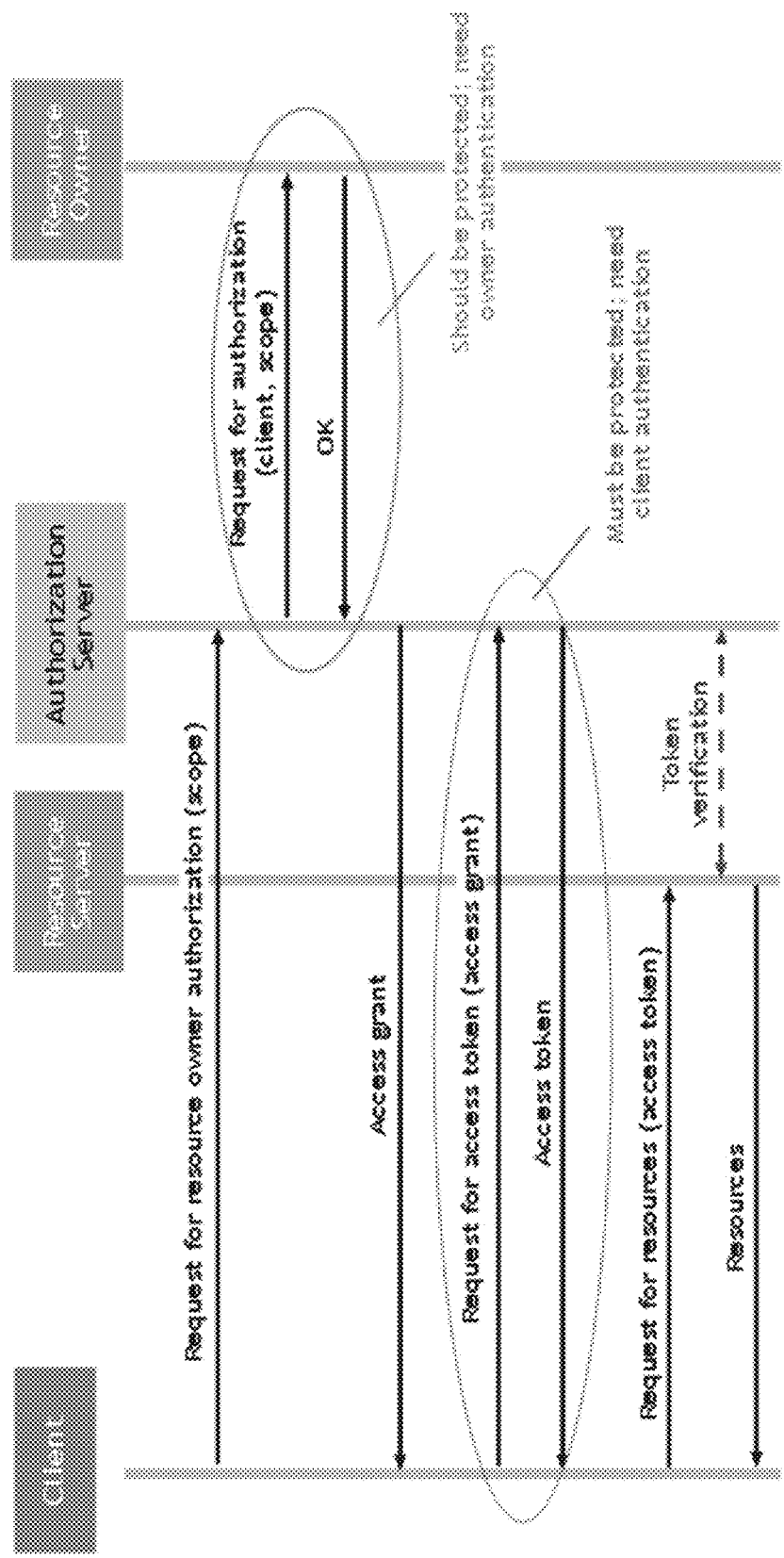
FIG. 8B is a messaging diagram for authenticating a client (requesting node) to use resources in a resource server owned by another node (resource owner) via an OAuth protocol according to one embodiment of the invention.

FIG. 8B is a messaging diagram for authenticating a client (requesting node) to use resources in a resource server owned by another node (resource owner) via the OAuth protocol according to one embodiment of the invention. In this regard, the client requests an authorization server for authorization to use resources of the resource owner. The authorization server forwards the request to the resource owner, and receives approval from the resource owner. The authorization server transmits a message to the client informing it of the grant of access to the resources. The client and authorization server then exchange messages to provide to the client an access token. Future requests for resources from the resource owner are transmitted to the resource server along with the access token, and if verified, the requested resources are provided by the resource server.

Figure 9:
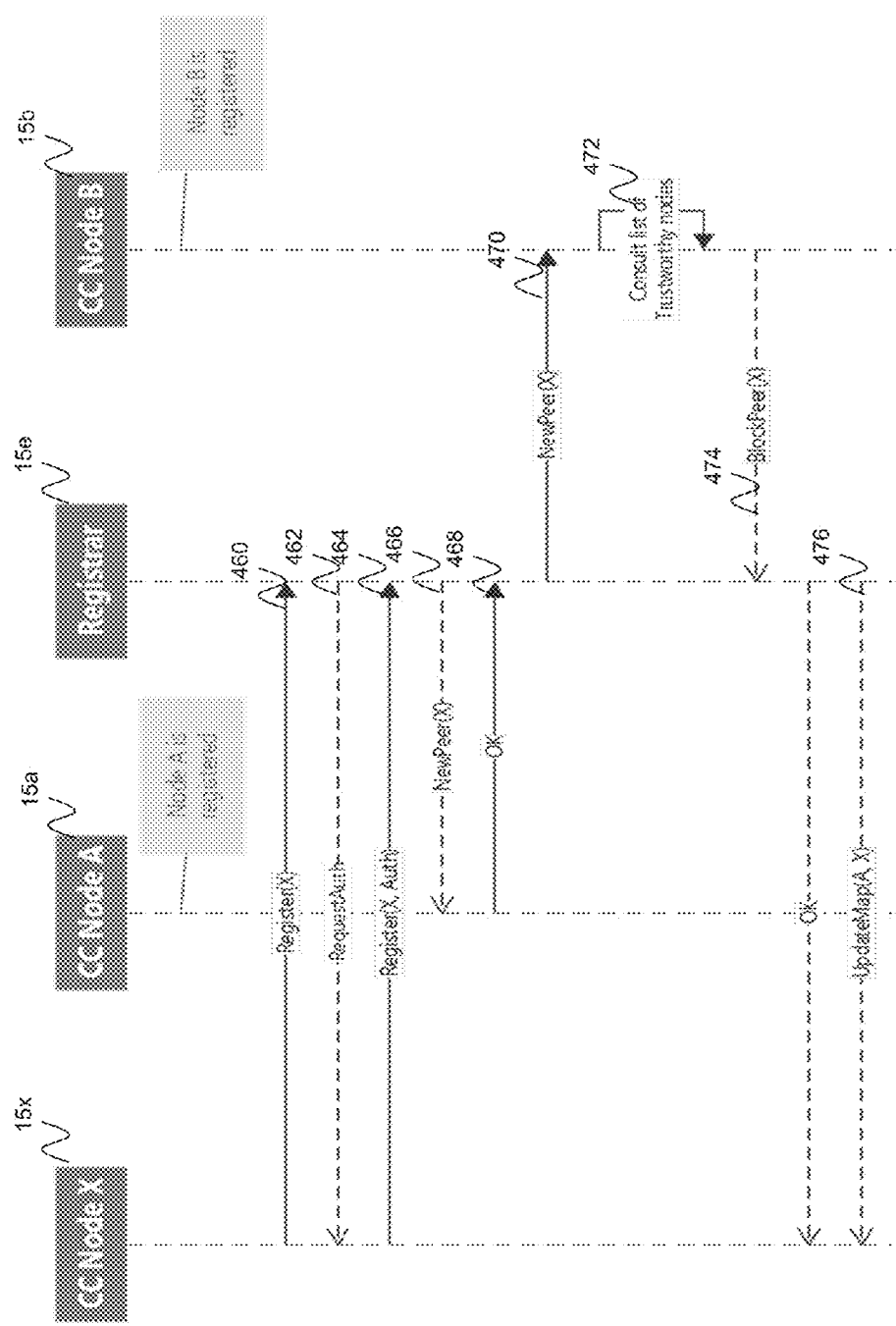
FIG. 9 is a messaging diagram of exemplary messages exchanged between CC nodes and a registrar node where CC node X is denied access to the federation by one of the CC nodes according to one embodiment of the invention.

FIG. 9 is a messaging diagram of exemplary messages exchanged between the CC nodes 15a, 15b, 15x and the registrar node 15e where CC node X 15x is denied access to the federation by one of the CC nodes according to one embodiment of the invention. In this example, it is assumed that CC nodes A and B 15a, 15b are already part of the federation/P2P network and registered with the registrar node 15e.

In act 460, CC node X 15x desiring to join the P2P network transmits a registration request. In act 462, CC node X 15x transmits its authentication data, and in act 464, CC node X is authenticated by the registrar 15e.

In act 466, the registrar node 15e informs CC node A 15a of the new peer node X, and CC node A accepts the new peer in act 468 via an OK message.

In act 470, the registrar node 15e also informs CC node B 15b of the new peer node X, but node B decides that it will not accept the new peer upon consulting a list of trustworthy nodes in act 472. There may be various reasons why CC node B will not accept the new node. For example, CC node X may be associated with a different enterprise, or may be located in a different geographic location.

According to one embodiment, the registrar node 15e accepts the new peer in the federation since at least one node in the federation has accepted the new peer. However, if all pre-registered nodes block the new peer, the registrar node 15e rejects the registration request.

Figure 10:
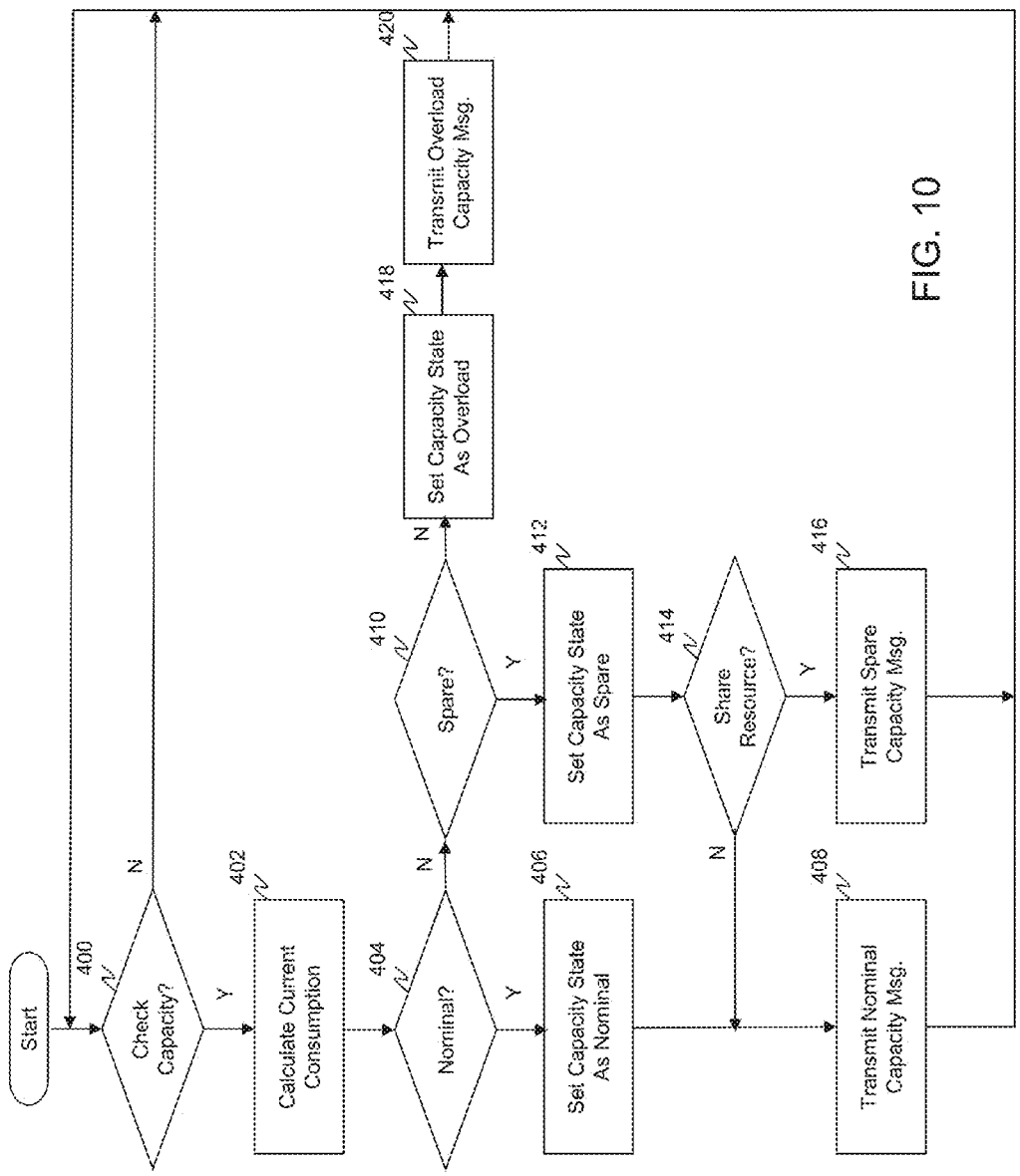
FIG. 10 is a flow diagram of a process for monitoring and determining capacity of a particular resource or resource type, according to one embodiment of the invention.

The registrar node then keeps track of which nodes have agreed to participate in the federation and sends an appropriate map to CC node X in act 476. For example, CC node X receives a map listing CC nodes A and X, but not CC node B. On the other hand, CC node B 15b receives a map listing CC nodes A and B, but not CC node X FIG. 10 is a flow diagram of a process for monitoring and determining capacity of a particular resource or resource type (collectively referred to as "resource"), according to one embodiment of the invention. The process may be described in terms of a software routine executed by a microprocessor based on instructions stored in memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the processes are not fixed, but can be altered into any desired sequence as recognized by a person of skill in the art.

The process starts, and in act 400, the capacity server 22 monitors for a criterion for determining whether it should check the current capacity. The criterion may be, for example, a set time, elapse of time period, a user invoked command, and/or the like.

Once a determination is made that the capacity check should be made, the capacity server 22 calculates or detects, in act 402, the current consumption or utilization of the resource. In this regard, if agent resources are to be monitored, the capacity server 22 communicates with, for example, the statistics server 16, for identifying occupancy of agents. The occupancy information may be as simple as indicating that the agent is busy doing something, or as complicated as indicating the particular type of activity that the agent is currently involved in (e.g. inbound voice, outbound campaign, email, chat, back office work, training, etc.), the communications medium utilized for the activity (e.g. voice, text, email, etc.), how long the agent has been involved in the activity, and the like. The capacity server 22 may also measure other current contact center metrics such as, for example, a current interaction volume.

In another example, if the resource to be monitored are media ports on the media server 18, the capacity server 22 may determine the number of media ports that are currently in use, and, according to one embodiment, the amount of time in which each port has been in use, the current interaction volume, and the like. In yet another example, if the resource to be monitored is CPU usage, the capacity server 22 may determine the level of CPU consumption as well as identification of a number of requests that each server 12-22 is processing at the given time.

In act 404, the capacity server 22 determines whether the capacity state of the resource is nominal. In this regard, the capacity server 22 compares forecast contact center metric and/or scheduled resources against current metrics obtained in act 402. For example, if the current interaction volume is between lower and upper thresholds 96, 98 of the forecast interaction volume, and/or the current agency occupancy rate is between lower and upper thresholds of the forecast agent occupancy rate, the contact center may be deemed to be in a nominal capacity state with respect to agent resources. In a more concrete example, if it is forecast that between 40 and 44 calls are expected at a particular time interval that need to be routed to agents, and only 42 calls are detected, the agent resources may be deemed to have nominal capacity. In addition or alternatively from measuring interaction volume, if it is forecast that the agent occupancy rate will be between 89% and 97%, and the current occupancy rate is 95%, agent resource may be deemed to have nominal capacity.

For media server resources, if it is predicted that 80%-90% of the media ports will be used during a particular time interval, and the current consumption of the media ports is 85%, the media server may be deemed to be functioning at a nominal capacity.

If the resource is at a nominal capacity, the capacity server 22 sets, in act 406, the capacity state of the resource as being in a nominal capacity state. Such state data may be maintained, for example, in memory of the CC node, along with an identifier of the resource.

In act 408, the capacity server 22 transmits a nominal capacity message to one or more other peer nodes 15 over the wide area network 11.

Referring again to act 404, if the capacity server 22 determines that the capacity state of the resource is not nominal, it determines, in act 410, whether the capacity state of the resource is spare capacity. According to one embodiment, if the current consumption as calculated in act 402 is below the lower threshold 96, the capacity state of the resource may be deemed to be in a spare capacity state. In this case, the capacity server 22 sets, in act 412, the capacity state of the resource as being in a spare capacity state.

Even if the capacity server 22 has determined that there is spare capacity, there may be reasons why it would not be desirable to share the spare capacity with others at this time interval. For example, forecasting models may indicate that although there is spare capacity at the current time interval, no such spare capacity is forecast to be available in a following time interval. This may occur, for example, if a certain number of agents available during the current interval are scheduled to be on break during a next interval, or if an increased number of interactions are forecast during the next interval. Accordingly, in act 414, the capacity server determines whether the spare resource is to be shared.

If the answer is YES, the capacity server 22 transmits, in act 416, a spare capacity message to one or more other peer nodes 15 over the wide area network 11. According to one embodiment, resources that are reported as spare do not include capacity that has been borrowed from another node, under a contract. In other embodiments, resources that are reported as spare may include capacity borrowed under a contract. However, because reclaiming borrowed spare capacity may not be easy, once provided to another node for use, the node providing the extra capacity may need to seek for spare resources somewhere else.

Referring again to act 410, if the capacity server 22 determines that the capacity state of the resource is not spare capacity, the resource is in an overload capacity state where the current consumption of the resource is above the upper threshold 98. Accordingly, in act 418, the capacity server 22 proceeds to set the capacity state as being in an overload state.

In act 420, the capacity server 22 transmits an overload capacity message to one or more peer nodes 15 over the wide area network 11. The transmitting of the overload capacity message may also be conditional. For example, if the borrowing node is to pay for borrowing resources, but it has no budget for paying for such resources, it may decide not to send the overload capacity message until it has the funds to pay.

In addition to the deployment model discussed above where each CC site acts autonomously from other CC sties, there are several other deployment models that may benefit from the P2P mechanisms discussed above. Such other deployment models include an enterprise deployment, cross enterprise deployment, and cloud deployment.

Figure 11:
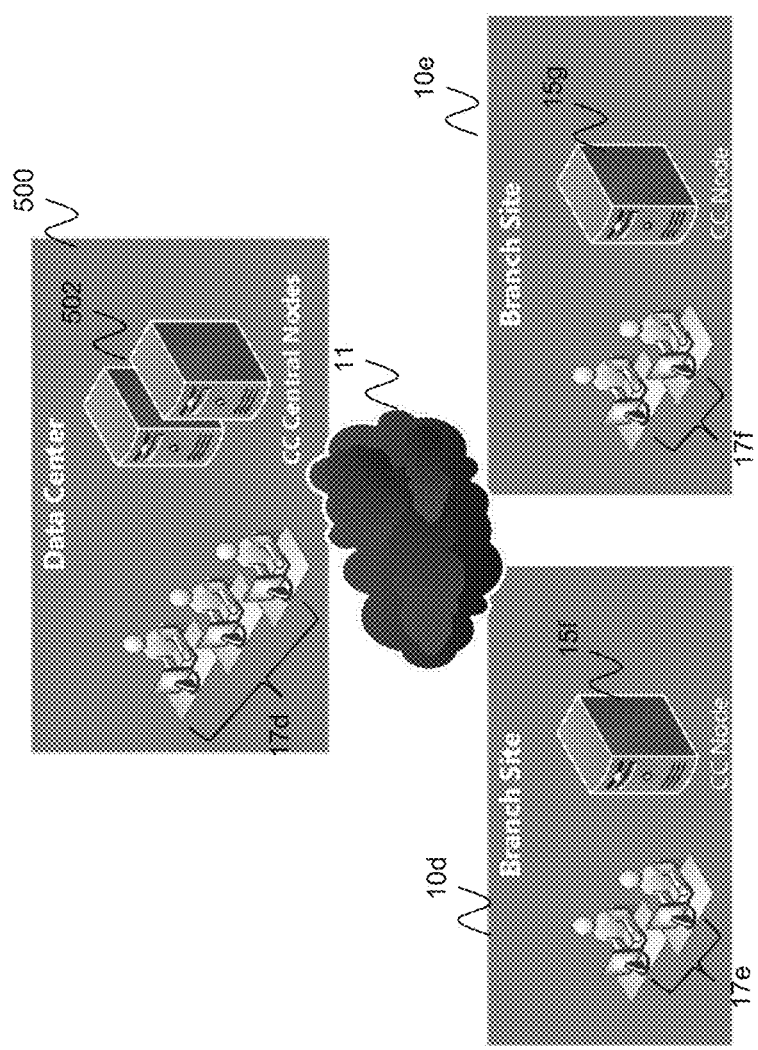
FIG. 11 is a block diagram of a distributed contact center system in an enterprise deployment according to one embodiment of the invention.

FIG. 11 is a block diagram of a distributed contact center system in an enterprise deployment according to one embodiment of the invention. In the illustrated embodiment, the deployment is for a single/same enterprise. In this regard, the data center is hosted by a particular enterprise for providing a bulk of the processing in providing contact center services for the enterprise. A person of skill in the art will understand, however, that the deployment may also be associated with multiple enterprises. According to the embodiment of FIG. 11, the contact center system includes a data center 500 with several branch CC sites 10*d*, 10*e*. According to one embodiment, a majority of the agents 17*d* log-in to the data center 500 while other agents 17*e*, 17*d* log-in to the branch CC sites 10*d*, 10*e* often based on the geographic location of the agents. The data center also hosts one or more CC central nodes 502 providing a bulk of computing resources as well as databases.

Each branch CC site 10*d*, 10*e* is coupled to the data center over the wide area data communication network 11, and includes, in addition to local agent resources, other local resources such as, for example, local media resources, web servers, and the like. Such other local resources are provided via branch CC nodes 15*f*, 15*g*.

According to one embodiment, centralized services are provided by the CC central nodes 502 of the data center 500. For example, IVR services may be provided centrally for all interactions, and subsequently routed to available agents. According to one embodiment, the voice network may be deployed so that voice traffic always arrives at the data center 500. According to another embodiment, routing strategies may be setup on the various CC nodes 15*f*, 15*g* to push the interactions to the data center 500 for central processing (e.g. via the IVR).

It may be desirable to force centralized processing at the data center in order to implement the P2P mechanism. For example, centralized IVR services may be provided at the data center 500 until the data center's IVR resource is in an overload capacity. In this case, local IVR resources provided by the branch CC nodes 15*f*, 15*g* may be invoked to share its local IVR resource with the data center 500. According to one embodiment, the local IVR resource shared with the data center 500 is configured to provide substantially the same IVR experience to the customer as when the customer interacts with the IVR at the data center 500. For example, the same or similar audio prompts are retrieved and played by the local media server in providing the local IVR service.

According to one embodiment, the enterprise deployment of FIG. 11 provides for local survivability of the branch CC sites 10*d*, 10*e* even if communication is lost between the branch CC nodes 15*f*, 15*g* and the data center 500. When the branch CC sites 10*d*, 10*e* function in the local survivability mode, contact center services are still capable of being provided despite the loss of connection to the data center 500. There may be different reasons for local survivability: 1) there is a loss of connection between the branch CC sites 10*d*, 10*e* and the data center 500, but both the branch sites and the data center are operational; 2) service loss due to the data center 500 being out of service; and 3) there is partial connectivity or service loss (e.g. only for voice but not for email).

According to one embodiment, when in local survivability mode, interactions from customers may still be accepted and routed to agents in the contact center. Text messages, emails, and chat sessions may still be possible with agents of the contact center. In some embodiments, the quality or type of contact center service may be reduced during local survivability. For example, agents may not have access to interaction histories maintained at the data center 500 when connection to the data center is lost, or the data center is out of service.

Figure 12A:
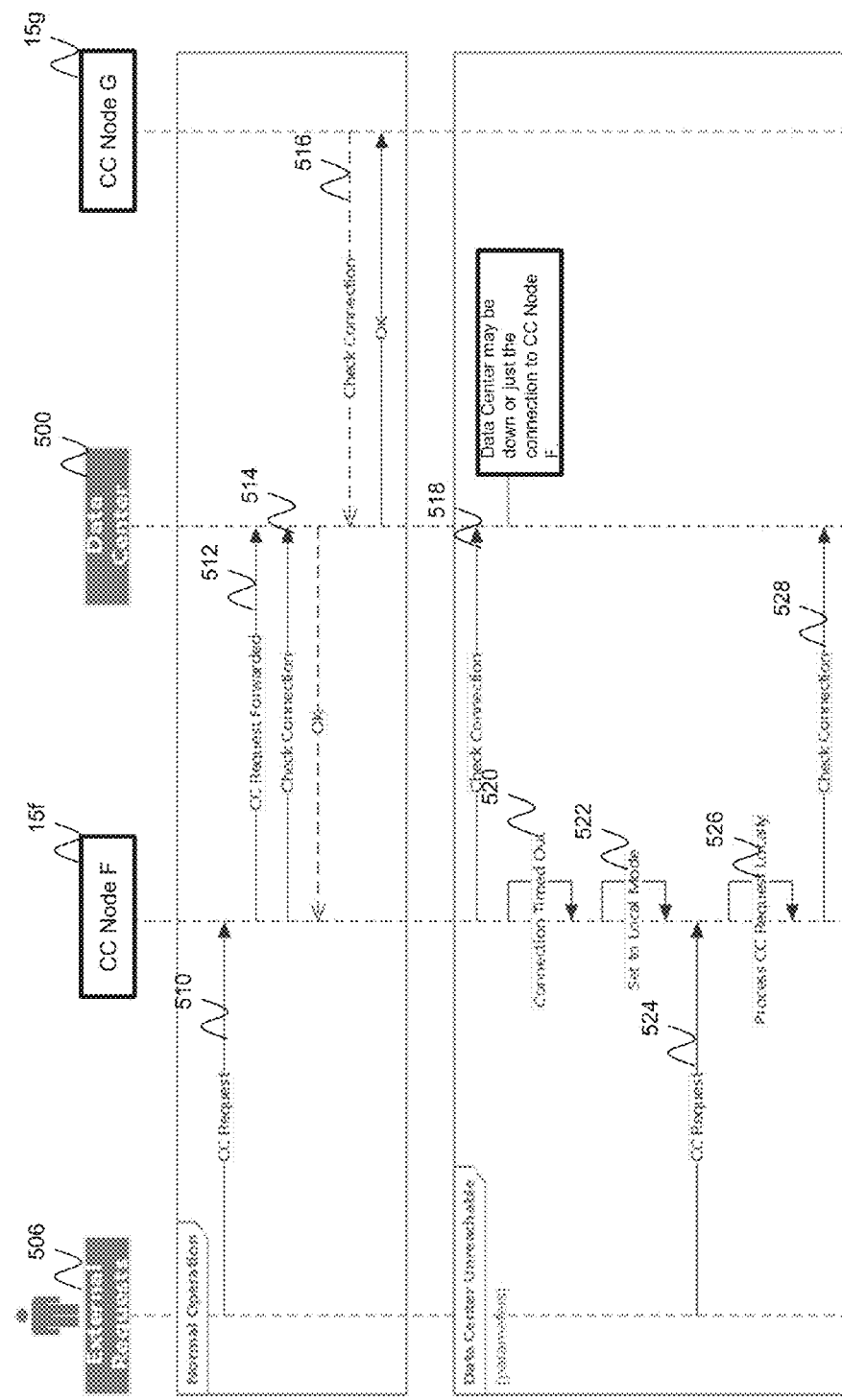
FIGS. 12A-12B are messaging diagrams of exemplary messages exchanged between branch CC nodes and a data center for enabling local survivability according to one embodiment of the invention.
Figure 12B:
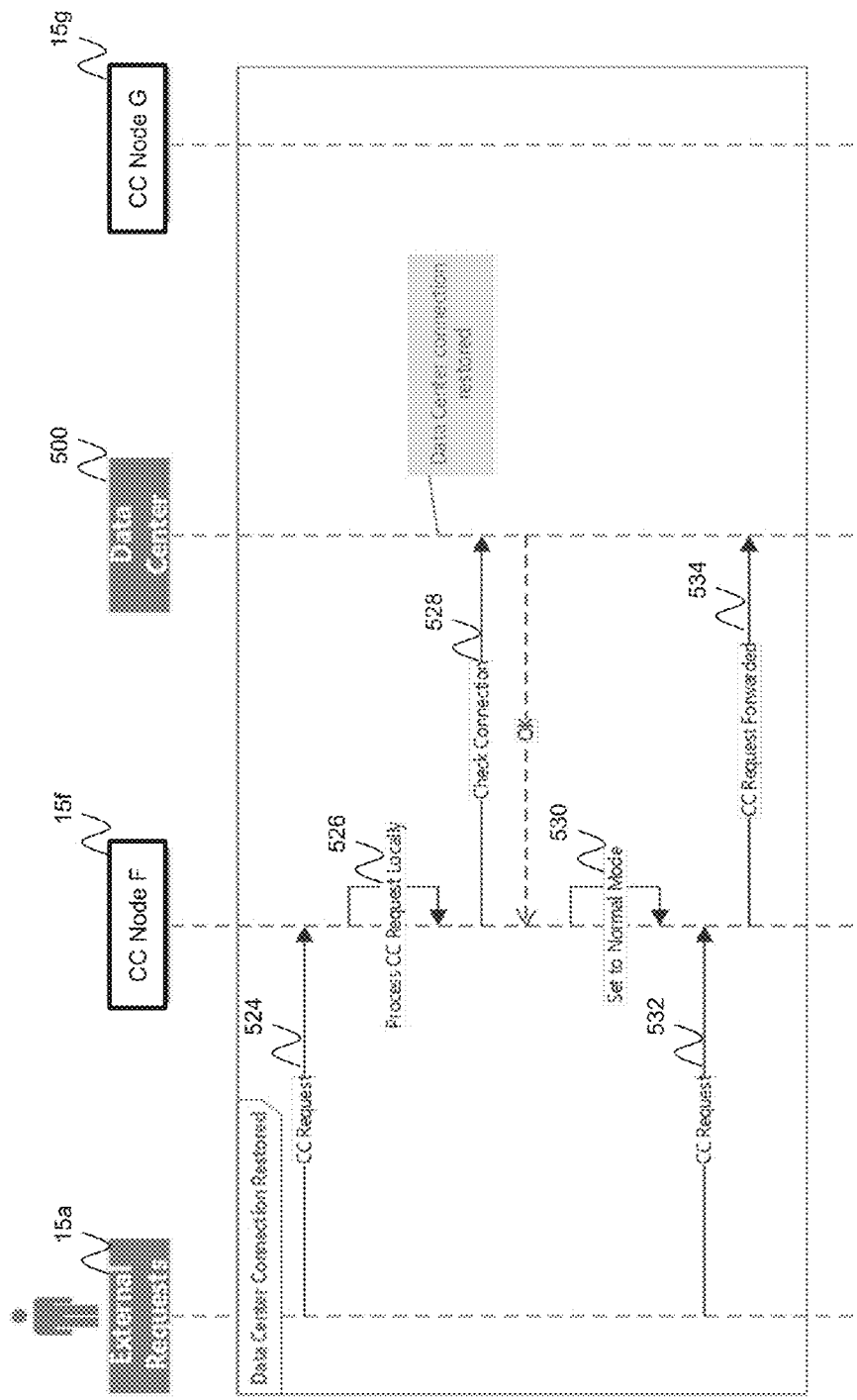

FIGS. 12A-12B are messaging diagrams of exemplary messages exchanged between the branch CC nodes 15*f*, 15*g* and the data center 500 for enabling local survivability according to one embodiment of the invention.

During normal operation, requests from different external sources 506, including requests for interaction, are received by CC node F 15*f* in act 510, and forwarded to the data center 500 for processing in act 512. For example, the request may be a request for telephony interaction arriving at the media gateway 28. In response to receipt of the request, the SIP server 12 may be invoked to determine that the request is to be forwarded to an IP address associated with the data center 500 for receiving centralized services from the data center. Although for simplification purposes the request is described as being forwarded, a person of skill in the art should recognize that the forwarding of the request may entail generating a new request based on the original request.

According to one embodiment, the IP address to which the request is forwarded may be, for example, the IP address of the SIP server and/or media server hosted by the CC central node 502. The identification of the IP address may be, for example, by the routing server 14 in response to executing a routing strategy to route the request. For example, the routing strategy may indicate that all telephony interactions are to be first handled by providing IVR treatment. According to one embodiment, if the connection to the data center is functioning normally, the routing server 24 may be configured to identify the IP address of the SIP server and/or media server hosted by the CC central node. The routing server may also identify the CC central node by name, and a mapping routine may be invoked to identify the actual IP address.

In act 512, CC node F 15*f* forwards the request to the data center 500. This may include exchanging SIP messages between CC node F 15*f* and the CC central node 502. The SIP messages may identify, for example, the type of service (e.g. specific media service) requested via the request. A voice connection (e.g. utilizing RTP protocol) may further be established between a sender of the external request and a resource at the data center. For example, if the service to be provided by the data center is IVR treatment, a voice connection is established between an end device of the sender and a port on the media server 18 hosted by the CC central node 502. Of course, other services may be provided by the data center, such as, for example, playing music, call conferencing, call recording, and the like. Non-voice services that may be provided by the data center may include automated responses to email, chat, text, and the like. The data center may also receive requests regarding configuration updates, report generation, and the like.

According to one embodiment, data maintained centrally in the mass storage device 24 that is hosted by the data center is retrieved in providing the centralized services. Such data may include, for example, customer data including data on the customer's past interactions.

CC node F 15*f* continually checks if the data center 500 is reachable in acts 514, 518, and 528, as does CC node G in act 516. Any one of various well known mechanisms may be used for this determination as will be understood by a person of skill in the art, such as, for example, Ping, SIP messages, HTTP, Inter Server Connection Control, and the like. As a person of skill in the art should appreciate, the checking of viability of the data center may be decoupled from the receiving and forwarding of requests. For example, the nodes may periodically ping the data center for checking whether communication with the data center is possible. The frequency of the pings may be intelligently adjusted as needed.

If the connection check times out in act 520, and the data center 500 does not return a response within a set time period, CC node F 15*f* transitions to a local survivability mode in act 522 and processes future requests locally. The lack of response from the data center 500 may be due to the data center being down, either fully or partially (e.g. for one media type and not for another). Alternatively, the connection to CC node F may be down, either fully or partially (e.g. for one media type and not for another). If the data center is down, CC node G 15*g* also transitions to a local survivability mode. If it is just the connection to CC node F that is down, CC node G does not transition to the local survivability mode unless its connection is also down.

According to one embodiment, the transitioning of CC node F 15*f* to local survivability mode may include the capacity server 22 setting a flag indicative that it is now in local survivability mode. In addition, the capacity server may also be configured to awaken sleeping (stand-by) survivability resources, such as, for example, a stand-by interaction server.

In act 524, CC node F receives a CC request from the external source 506. The CC request is one that would typically be forwarded to the data center 500. In response to the request in act 524, the SIP server 12 or routing server 14 determines whether the local survivability mode flag has been set. In response to the flag being set, the SIP server refrains from forwarding the request to the CC central node 502 at the data center 500. Instead, in act 526, CC node F 15*f* processes the request locally. In this regard, the SIP server at CC node F may forward the request to a local media server hosted by CC node F 15 for providing, for example, IVR treatment for the request, call recording, and/or the like. According to one embodiment, the IP address of the local media server may be identified by the routing server 14 upon the local survivability mode flag being set. The IP address of the local media server is identified in lieu of the IP address of the SIP server and/or media server hosted by the CC central node. According to one embodiment, while CC node F is in local survivability mode, it may exchange resource capacity with other peer nodes such as, for example, CC node G 15*g*. CC node F and CC node G may share each other resources if one node has spare capacity while the other node is in need of additional capacity.

Once the data center connection is restored, as depicted in the embodiment of FIG. 12B, the data center 500 timely responds to the message in act 528 to check the connection. In act 530, CC node F 15*f* transitions to a normal mode. This may entail, for example, unsetting the local survivability mode flag, and putting stand-by resources that were awakened, back in stand-by mode. In act 534, CC node F 15*f* forwards to the data center 500 external requests received in act 532 for processing by the data center.

According to another embodiment, local survivability upon loss of communication with the CC central node 502 in the data center 500 is made possible by designating the branch CC nodes 15*f*, 15*g* as a standby system for the data center operation. According to this embodiment, agents log into the SIP server 12 of the CC central node 502 during normal operation. Branch CC nodes 15*f*, 15*g* remain idle until an event occurs that disables the data center 500. When such an event occurs, the agents log into a designated branch node, whether it is CC node F 15*f* or CC node G 15*g*.

According to one embodiment, a notification may be sent to the agents 17*d* logged into the data center via an application (e.g. a desktop application) installed in a respective agent device 30 (FIG. 3). For example, the desktop application may be configured to transmit heartbeat messages to the CC central node 502. In response to lack of response to the heartbeat messages within a preset timeout period, the desktop application may be configured to display a message on an agent display device to inform the agent of the lack of response. The message may further prompt the agent to manually log into the SIP server 12 at one of the branch CC nodes 15*f*, 15*g*. According to one embodiment, the desktop application may be configured to retrieve data on the branch CC node (secondary node) to which the agent is designated, and prompt the agent to log into the particular branch CC node. Data on the secondary node associated with an agent may be retrieved from, for example, the agent's profile record.

According to one embodiment, the message to the agent may be a message to call an IVR application on the designated secondary node in order to re-log the agent onto the secondary node. The IVR application may be configured to play prompts to guide the agent in the re-log process. The data captured by the IVR application may then be provided to the SIP server on the secondary node to effectuate the re-log process.

Alternatively, the desktop application may be configured to automatically re-log the agent into the designated secondary node in response to detecting loss of communication with the CC central node 502 (primary node). According to one embodiment, the agent maintains his or her directory number used to reach the agent.

According to one embodiment, a session border controller (not shown) at the border of the wide area network 11 and the data center 500 and/or other network elements may also be configured to monitor connection with the CC central node 502. In response to detecting loss of communication, the session border controller (also referred to as an edge device) may be configured to automatically forward inbound telephony communication to the CC central node 502 to an appropriate CC branch node 15*f*, 15*g*. Identification of the appropriate CC branch node 15*f*, 15*g* to which to forward an inbound telephony communication may be determined based on configuration settings at, for example, the session border controller. The configuration settings may include, for example, the IP address of the appropriate SIP server 12 to which to forward the communication.

According to one embodiment, the agent devices as well as other network elements such as the session border controller continue to monitor to detect restored connection with the CC central node 502 when the CC central nodes return to normal operation. In response to detecting the restored connection, the agents are prompted to re-log into the data center. According to one embodiment, an auto-logout message may be sent to the branch CC nodes 15f, 15g to disconnect all agents, forcing the agents to re-log into the primary node. The network elements may also stop the redirection of telephony communication to the CC branch nodes and instead target requests back to the data center 500, enabling graceful transition instead of abrupt disconnection of current calls.

In addition to the enterprise deployment as discussed above with respect to FIGS. 11-12B, a cross-enterprise deployment may also benefit from the P2P mechanisms discussed above.

Figure 13:
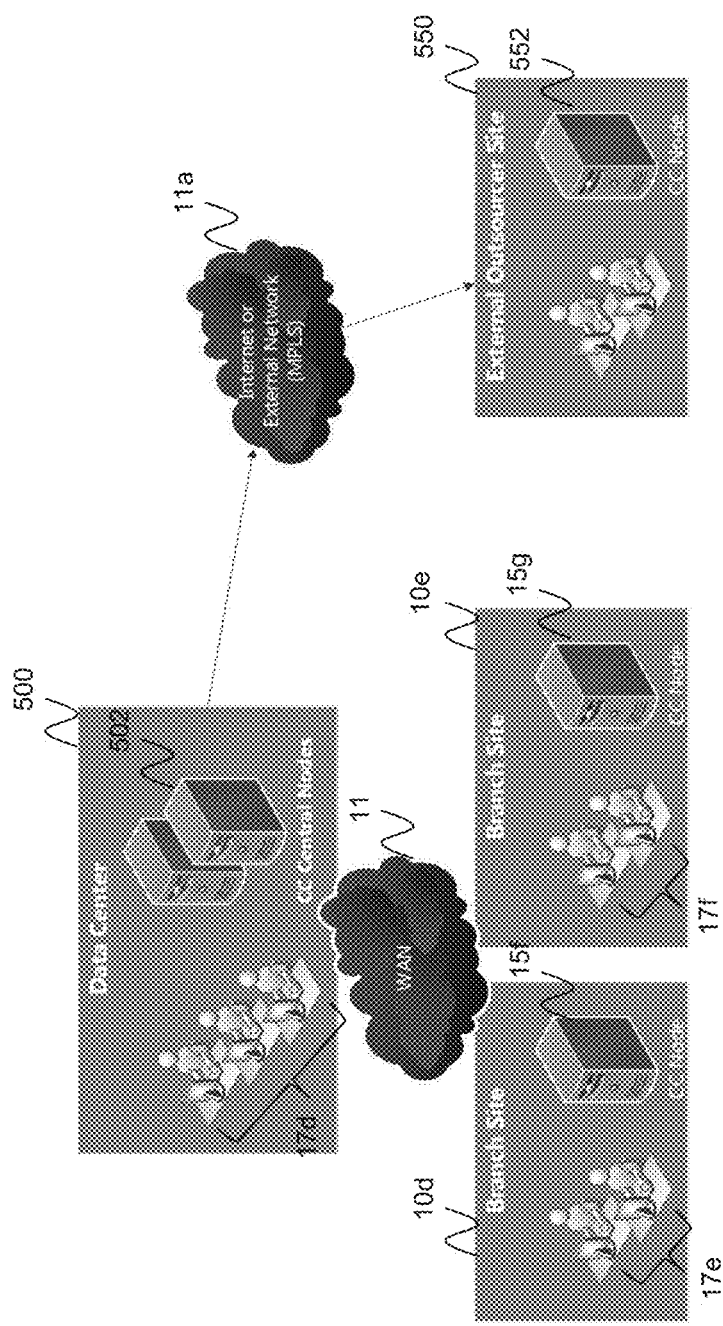
FIG. 13 is a block diagram of a distributed contact center system in a cross-enterprise deployment according to one embodiment of the invention.

FIG. 13 is a block diagram of a distributed contact center system in a cross-enterprise deployment according to one embodiment of the invention. In addition to the system components present in the enterprise deployment, the system in the cross-enterprise deployment includes an outsourcer site 550 coupled to the data center 500 via a wide area network 11a which may be similar to the wide area network 11. For example, the wide area network 11a may be the Internet or MPLS network.

According to one embodiment, as resources at the contact center premise represented as the data center 500 and branch CC sites 10d, 10e, becomes overloaded, additional resources may be obtained from the outsourcer site 550. The outsourcer site 550 includes an outsourcer CC node 552 which may be similar to the CC nodes 15 of the prior embodiments. According to one embodiment, the outsourcer site 550 is separate from the enterprise associated with the data center 500 and branch CC sites 10d, 10e. Resources in the outsourcer site 550 may be available to be shared to other peer members in a federation upon the outsourcer CC node 552 being accepted into the federation. The acceptance of the outsourcer CC node 552 into the federation may be done according to the mechanism discussed above with respect to FIG. 9. For example, the outsourcer CC node 552 may register itself with a registrar node similar to the registrar node 15e of FIG. 9. The registration of the outsourcer CC node is accepted if at least one of the federal nodes accepts the peer.

According to one embodiment, although the outsourcer CC node 552 is configured to provide additional capacity to the contact center premise, the outsourcer does not push its own load to the contact center premise.

According to one embodiment, additional controls and constraints may be introduced in the sharing of resources between the various CC nodes. For example, if the outsource services multiple enterprises, the external outsourcer node 552 may not send requests back to the enterprise that did not originate the request.

According to one embodiment, connectivity between the outsourcer 550 and the main enterprise data center 500 is established via a wide area network 11a so that voice and HTTP traffic may be exchanged between the companies.

According to one embodiment, an auction house for outsourcers may be set up to make their services and resources available to various corporations. Companies may select the outsourcer based on their price and possible feedback or reviews of the outsourcers. Companies may also publish their outsourcing requirements at the auction house for bids from the outsourcers.

Once a company has one or more outsourcers selected, the company may, via the main data center 500, setup their federation/registrar to allow the outsourcer 550 to join their network for overload services as discussed above. There may be two contract models for outsourcing: 1) interaction volume based; and 2) agent resources based. In both cases, the outsourcing may be for a defined period of time.

Figure 14:
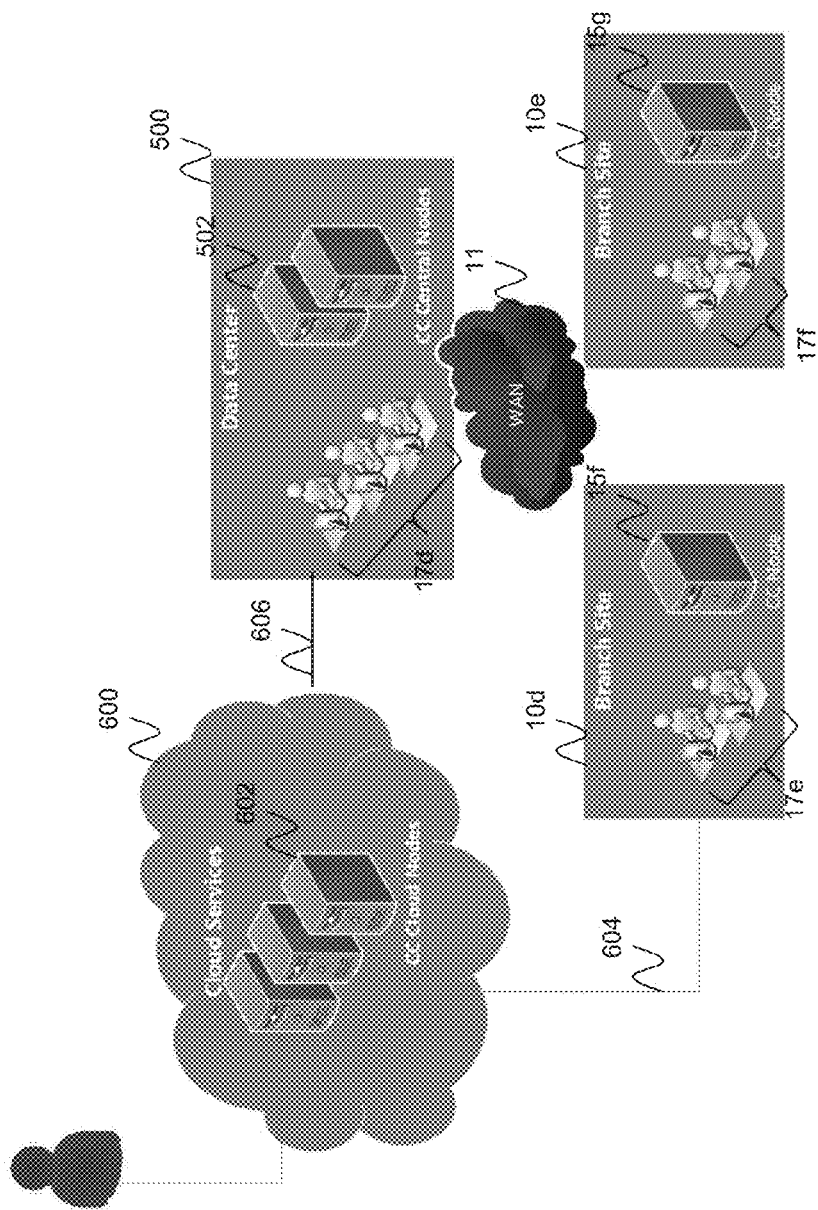
FIG. 14 is a block diagram of a distributed contact center system in a cloud deployment according to one embodiment of the invention.

FIG. 14 is a block diagram of a distributed contact center system in a cloud deployment according to one embodiment of the invention. The cloud deployment includes the data center coupled to the CC branch sites 10d, 10e over the wide area network 11 as in the enterprise and cross-enterprise deployments. In addition, at least some of the contact center services are provided via CC cloud nodes 602 at a cloud site 600. In a full cloud deployment model, all contact center services are provided via resources on the cloud site 600. The cloud site 600 may provide such services to multiple contact centers as a software as a service.

In a hybrid cloud deployment model, some contact center services are provided via resources at the data center and/or branch sites 500, 10d, 10e, while other services are provided via resources on the cloud site 600. For example, inbound traffic may be directed to the cloud CC nodes 602 for initial IVR treatment, and then routed to on-premise agents over data link 604 via a wide area network similar to wide area network 11. According to one embodiment, data link 604 traverses the MPLS network.

In another example, agents may be logged into the CC cloud nodes 602, but corporate data may be retrieved from the data center 500 over data link 606 via a wide area network similar to wide area network 11. The corporate data may include, for example, information on the customers of the enterprise which are maintained, for example, in a customer relations management (CRM) database. In this regard, the data link 606 may be a secure data link provided, using, for example a secure data communications protocol conventional in the art.

With respect to sharing of resources and local survivability, the cloud nodes 602 may be a P2P node to the CC central nodes 502 and/or branch CC nodes 15f, 15g. According to one embodiment, most if not all contact center services are provided by the premise resources via the CC central node 502 and/or CC branch nodes 15f, 15g. According to this embodiment, the CC cloud nodes 602 are stand-by nodes that share their resources when the premise resources are in overloaded capacity states, and/or during an emergency (e.g. when connection to the data center 500 is lost). In this regard, the cloud node 600 may be treated as an outsourcer site similar to outsourcer site 500 in the cross-enterprise deployment. In this case, the agents and other cloud CC resources are not necessarily un-trusted commodities but additional company resources. According to one embodiment, when the branch CC sites 15f, 15g lose connection to the data center 500, agents 17e, 17f at the branch CC sites may log into the CC cloud nodes 602 (either manually or automatically) at the cloud site 600.

According to another embodiment, most if not all contact center services are provided by the CC cloud nodes 602, with the premise nodes acting as stand-by nodes.

Figure 15:
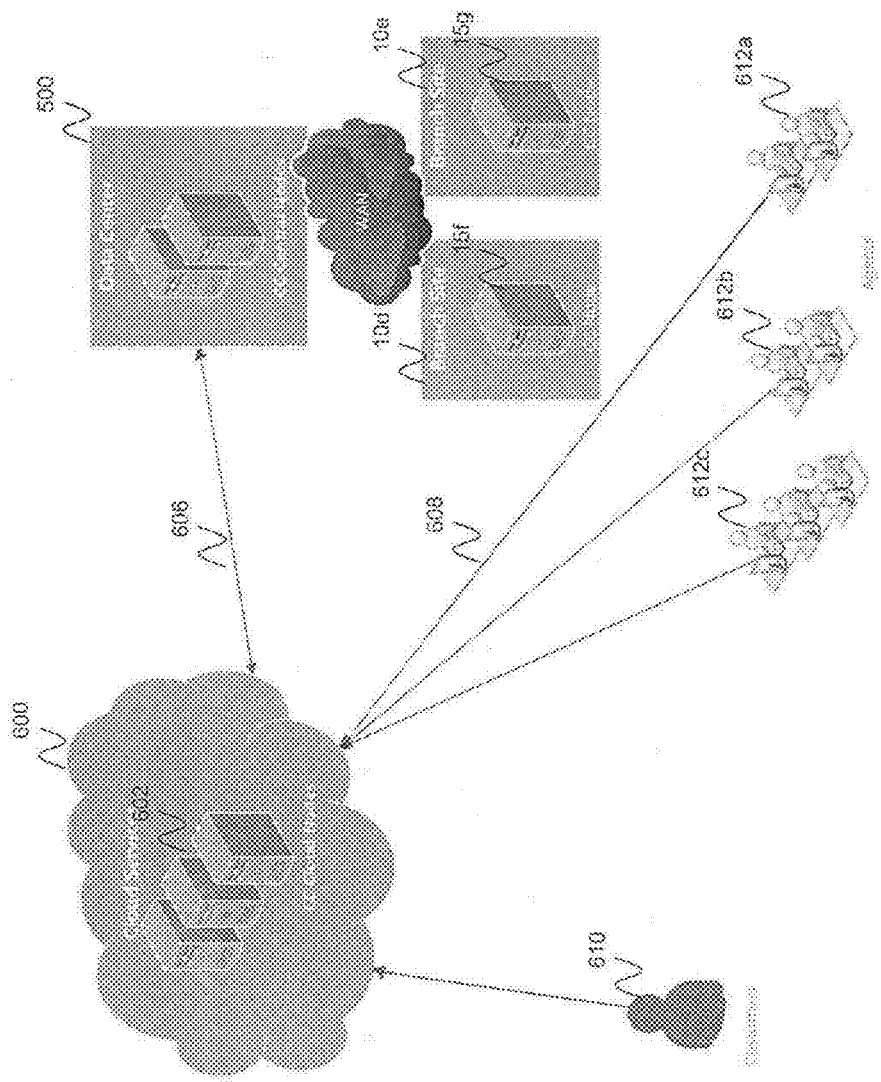
FIG. 15 is a block diagram of a cloud deployment where contact center services are provided by CC cloud nodes during normal operations according to one embodiment of the invention.

FIG. 15 is a block diagram of a cloud deployment where contact center services are provided by the CC cloud nodes 602 during normal operations according to one embodiment of the invention. According to this embodiment, the premise nodes share their resources when the CC cloud resources are in overloaded capacity states, and/or during an emergency (e.g. when connection to the cloud nodes is lost). When the cloud nodes 602 are functioning normally, agents 612a-612c (collectively referenced as 612) log into the CC cloud nodes 602 over data links 608. According to one embodiment, the data links 608 traverse the wide area network.

Telephony calls from customers 610 are also routed to the CC cloud nodes 602 and connected to the agents via the CC cloud nodes. According to one embodiment, certain information such as, for example, customer information, is stored in the data center 500 and retrieved over the secure data link 606.

Figure 16:
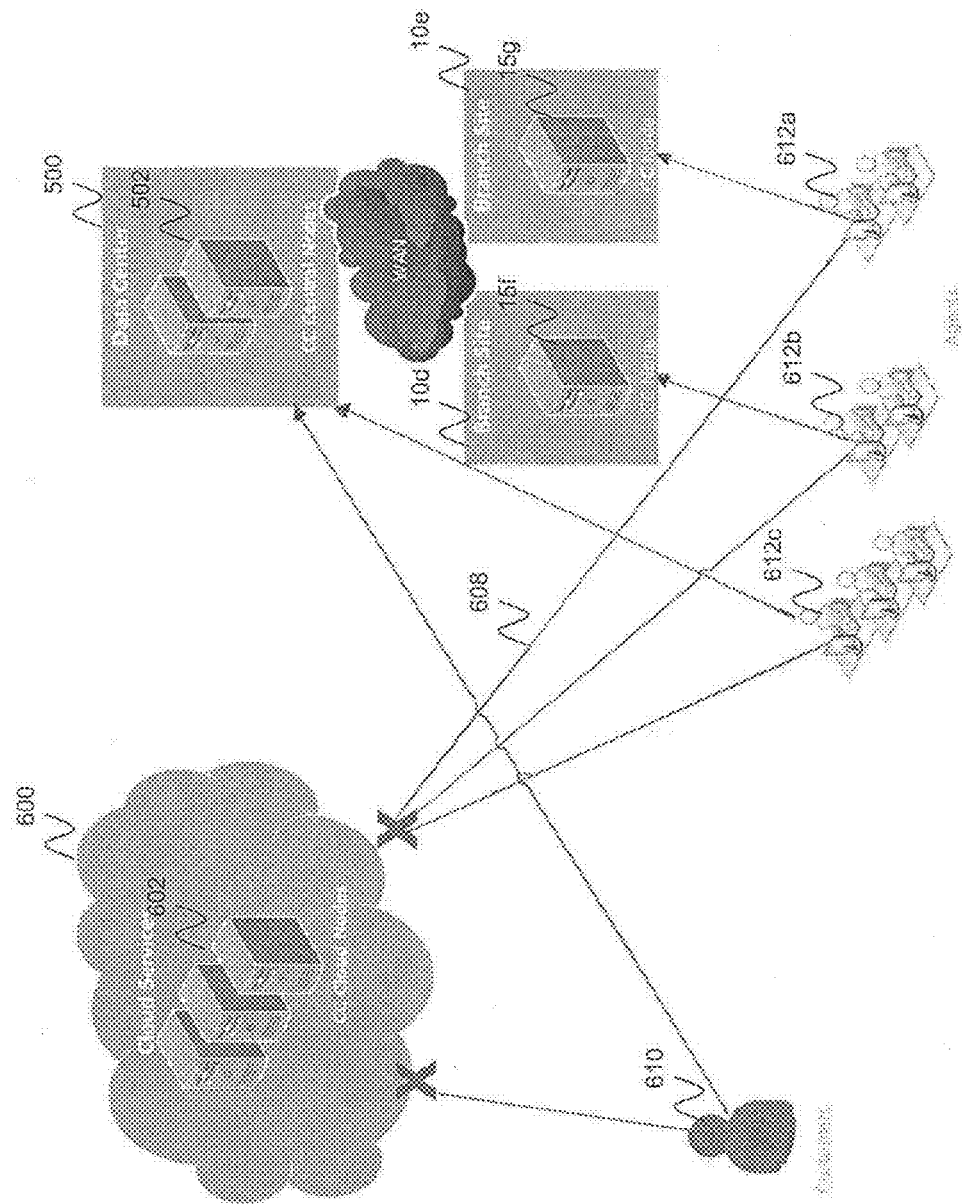
FIG. 16 is a block diagram of a cloud deployment depicting loss of connection to the CC cloud nodes causing the premise nodes to function in a local survivability mode according to one embodiment of the invention.

FIG. 16 is a block diagram of a cloud deployment depicting loss of connection to the CC cloud nodes causing the premise nodes to function in a local survivability mode according to one embodiment of the invention. According to this embodiment, applications installed in the agent devices 30 used by the agents 612 detect loss of connection to the CC cloud nodes 602. In this case, the agents re-log into the data center 500 or corresponding branch site 15f, 15g. The re-logging may be done in the manner described above with respect to other local survivability embodiments. Of course, the customers may also notice the loss of connection due to calls being redirected to a different telephone number, or a message providing the different telephone number to be dialed by the customers.

Requests from the customers 610 are forwarded to the premise nodes (either the CC central node 502 or branch CC nodes 15f, 15g) until connection to the CC cloud nodes are restored. According to one embodiment, each of the premise nodes act as a peer to the other nodes for sharing resources with one another.

Depending on the deployment and what services or information is maintained by the CC cloud nodes 602, loss of connection to the cloud nodes may mean reduced levels of functionality when the premise nodes are functioning in the local survivability mode. For example, if CRM data is maintained in the CC cloud nodes 602, the CRM data may not be available when the premise nodes are used during local survivability. Of course, if data is centralized in the data center 500, functionality of the premise nodes during local survivability may be the same as normal cloud operations.

Once the cloud connections are re-established, the agents 612 may re-log into the CC cloud nodes 602. As described in the above embodiments relating to local survivability, the re-log sequence may be automated in the agent's desktop application and/or via each node's own processing.

Each of the various servers, controllers, switches, gateways, engines, and/or modules (collectively referred to as servers) in the afore-described figures may be a process or thread, running on one or more processors, in one or more computing devices 1500 (e.g., FIG. 17A, FIG. 17B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 17A:
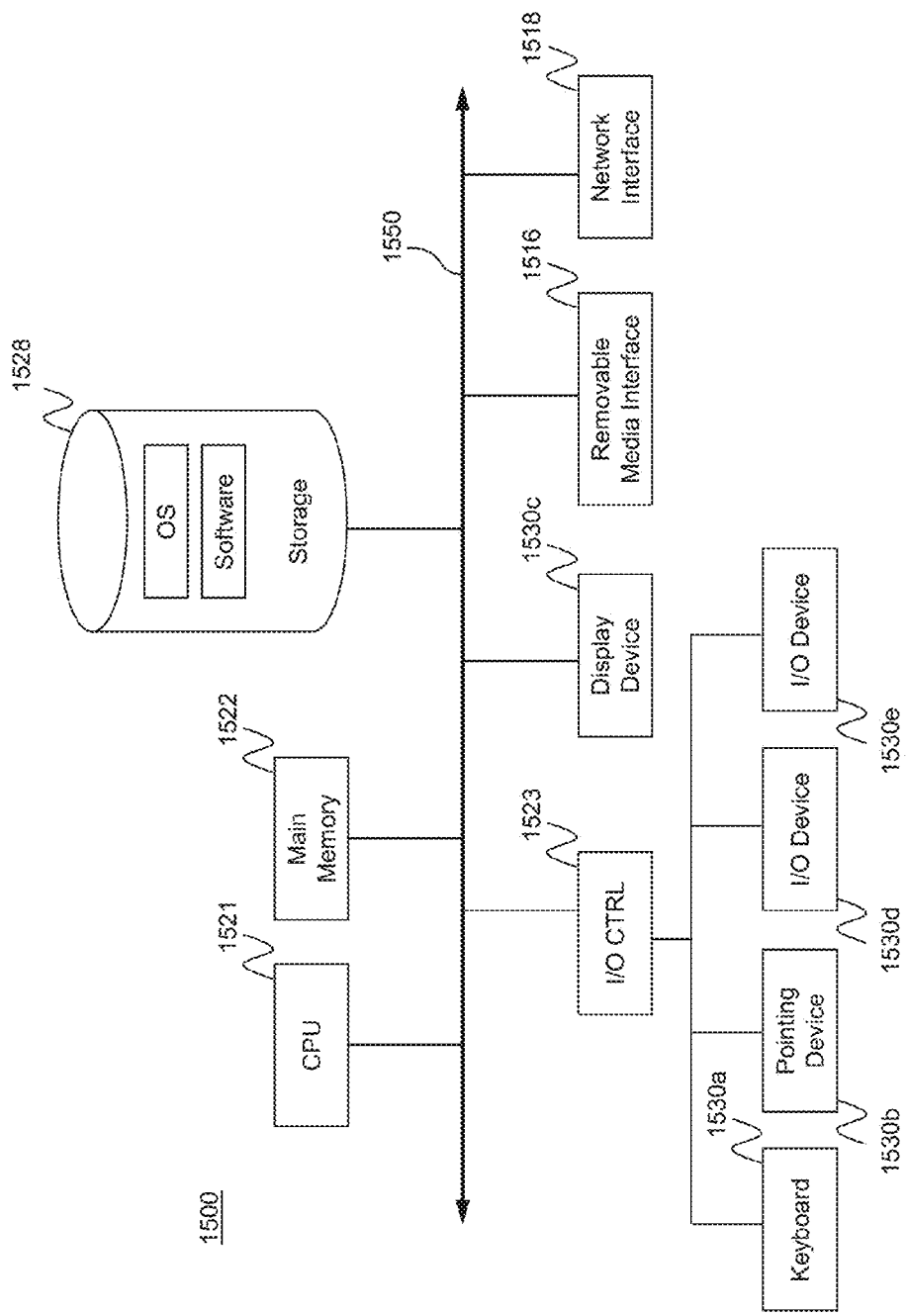
FIG. 17A is a block diagram of a computing device according to an embodiment of the present invention.
Figure 17B:
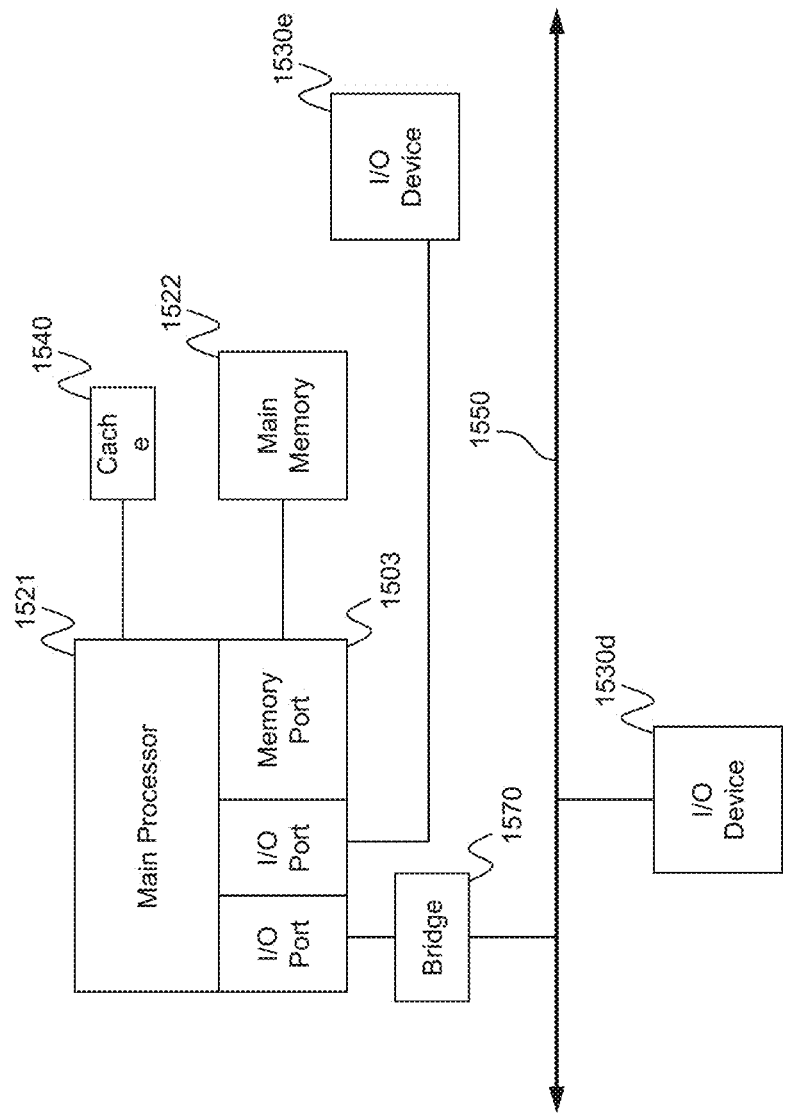
FIG. 17B is a block diagram of a computing device according to an embodiment of the present invention.
Figure 17D:
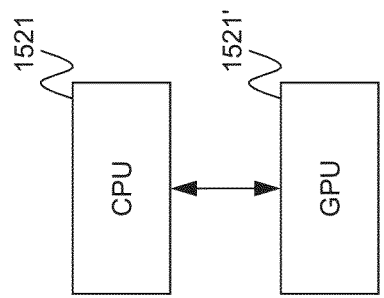
FIG. 17D is a block diagram of a computing device according to an embodiment of the present invention.

FIG. 17A and FIG. 17B depict block diagrams of a computing device 1500 as may be employed in exemplary embodiments of the present invention. Each computing device 1500 includes a central processing unit 1521 and a main memory unit 1522. As shown in FIG. 17A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 17B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 17A, the central processing unit 1521 communicates with the main memory 1522 via a system bus 1550. As shown in FIG. 17B, the central processing unit 1521 may also communicate directly with the main memory 1522 via a memory port 1503.

FIG. 17B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 17A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 17B depicts an embodiment of a computer 1500 in which the central processing unit 1521 communicates directly with I/O device 1530e. FIG. 17B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 17A, may control the I/O devices. The I/O controller may control one or more I/O devices such as a keyboard 1530a and a pointing device 1530b, e.g., a mouse or optical pen.

Referring again to FIG. 17A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 17A and FIG. 17B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 17C:
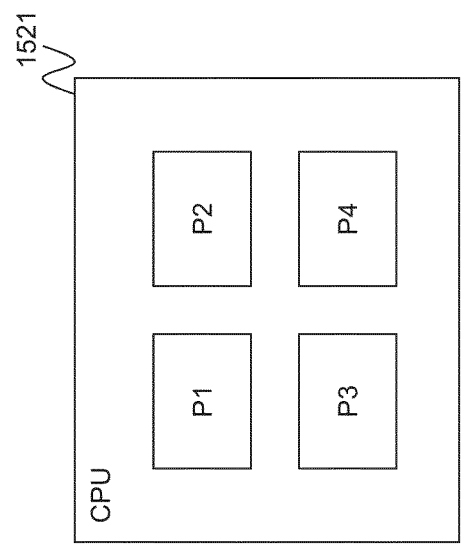
FIG. 17C is a block diagram of a computing device according to an embodiment of the present invention.

As shown in FIG. 17C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 17D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 17E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 17E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 17E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. The particular manner in which template details are presented to the user may also differ. Thus, the present embodiments of the invention should be considered in all respects as illustrative and not restrictive, the scope of the invention to be indicated by claims and their equivalents rather than the foregoing description.

The invention claimed is:

1. A method for resource sharing in a distributed contact center environment, the method comprising:
   monitoring, by a first contact center node, utilization of agent resources associated with the first contact center node;
   detecting, by the first contact center node, utilization of agent resources above a first threshold;
   in response to detecting utilization of agent resources above the first threshold, identifying, by the first contact center node, a second contact center node with spare capacity, wherein the first contact center node is coupled to the second contact center node over a peer-to-peer network;
   transmitting, by the first contact center node to the second contact center node, a first message in response to detecting utilization of agent resources above the first threshold, wherein the first message is indicative of a first type of capacity requested by the first contact center node;
   in response to the first message, receiving, by the first contact center node from the second contact center node, a second message, the second message being indicative of willingness of the second contact center node to provide the first type of capacity requested by the first contact center node;
   in response to receipt of the second message, routing, by the first contact center node, an interaction received by the first contact center node, to the second contact center node, for handling the interaction via agent resources associated with the second contact center node;
   detecting, by the first contact center node, spare capacity of the resources;
   determining, by the first contact center node, a condition relating to publication of the spare capacity;
   in response to the condition being satisfied, publishing, by the first contact center node, the spare capacity to the second contact center node; and
   in response to the condition not being satisfied, refraining from publishing, by the first contact center node, the spare capacity to the second contact center node.

2. The method of claim 1, further comprising:
   detecting, by the first contact center node, utilization of the agent resources below a second threshold;
   transmitting by the first contact center node to the second contact center node over the peer-to-peer network, a third message in response to detecting utilization of the agent resources below the second threshold, wherein the third message is indicative of a spare capacity of the agent resources associated with the first contact center node;
   receiving, by the first contact center node from the second contact center node, an interaction forwarded by the second contact center node; and
   handling, by the first contact center node, the forwarded interaction via a particular one of the agent resources associated with the first contact center node.

3. The method of claim 1, further comprising:
   detecting, by the first contact center node, utilization of the agent resources above the second threshold; and
   transmitting, by the first contact center node to the second contact center node over the peer-to-peer network, a fourth message in response to detecting utilization of the agent resources over the second threshold, wherein in response to the fourth message the second contact center node refrains from forwarding a new interaction to the first contact center node.

4. The method of claim 1, wherein the determining of the condition relating to publication of the spare capacity includes forecasting availability of the spare capacity at a future point in time.

5. A system for resource sharing in a distributed contact center environment, the system comprising:
a processor hosted by a first contact center node; and
a memory, wherein the memory stores instructions that, when executed by the processor, cause the processor to:
monitor utilization of agent resources associated with the first contact center node;
detect utilization of agent resources above a first threshold;
in response to detection of utilization of agent resources above a first threshold, identify a second contact center node with spare capacity, wherein the first contact center node is coupled to the second contact center node over a peer-to-peer network;
transmit to the second contact center node, a first message in response to detection of utilization of agent resources above the first threshold, wherein the first message is indicative of a first type of capacity requested by the first contact center node;
in response to the first message, receive from the second contact center node, a second message, the second message being indicative of willingness of the second contact center node to provide the first type of capacity requested by the first contact center node;
in response to receipt of the second message, route an interaction received by the first contact center node, to the second contact center node, for handling the interaction via agent resources associated with the second contact center node
detect spare capacity of the resources;
determine a condition relating to publication of the spare capacity;
in response to the condition being satisfied, publish the spare capacity to the second contact center node; and
in response to the condition not being satisfied, refrain from publishing the spare capacity to the second contact center node.

6. The system of claim 5, wherein the instructions further cause the processor to:
transmit to the second contact center node over the peer-to-peer network, a first message in response to detecting utilization of agent resources above the first threshold, wherein the first message is indicative of a first type of capacity of the agent resources associated with the first contact center node;
receive from the second contact center node over the peer-to-peer network, a second message indicative of the spare capacity of the agent resources associated with the second contact center node, wherein the instructions that cause the processor to route the interaction to the second contact center'node are in response to receipt of the second message.

7. The system of claim 6, wherein the instructions further cause the processor to:
detect utilization of the agent resources below a second threshold;
transmit to the second contact center node over the peer-to-peer network, a third message in response to detecting utilization of the agent resources below the second threshold, wherein the third message is indicative of a spare capacity of the agent resources associated with the first contact center node;
receive from the second contact center node, an interaction forwarded by the second contact center node; and
handle the forwarded interaction via a particular one of the agent resources associated with the first contact center node.

8. The system of claim 6, wherein the instructions further cause the processor to:
detect utilization of the agent resources above the second threshold; and
transmit to the second contact center node over the peer-to-peer network, a fourth message in response to detecting utilization of the agent resources over the second threshold, wherein in response to the fourth message the second contact center node is configured to refrain from forwarding a new interaction to the first contact center node.

9. A distributed contact center system for resource sharing, the system comprising a plurality of contact center nodes, each contact center node having a processor and memory, wherein the memory stores instructions that, when executed by the processor of each of the contact center nodes, cause the processor to;
monitor utilization of agent resources associated with the contact center node;
detect an overload state when utilization of the agent resources is above a first threshold;
responsive to detecting the overload state, transmit an overload message to other ones of the contact center nodes, the overload message being indicative of a request for the agent resources;
in response to the overload message, receive from at least one of the other ones of the contact center nodes, acknowledgment message indicative of willingness of the at least one of the other ones of the contact center nodes, to provide the requested agent resources;
in response to receipt of the acknowledgment message, route an interaction to the at least one of the other ones of the contact center for handling the interaction via the agent resources associated with the second contact center node;
detect a spare capacity state when utilization of the agent resources is below a second threshold;
responsive to detecting utilization of agent resources below the second threshold, transmit a spare capacity message to the other ones of the contact center resources.

10. The distributed contact center system of claim 9, wherein the memory in each contact center node further stores instructions that, when executed by the processor of each of the contact center nodes, cause the processor to:
when a contact center node in a spare capacity state detects that utilization of agent resources is no longer below the second threshold and another contact center node claimed the spare capacity, send a reclaim capacity message to the contact center node that claimed the spare capacity; and
when a contact center node in an overload state that has claimed spare resources from another contact center node receives a reclaim capacity message from the contact center node from which the contact center node in the overload state claimed spare resources, the contact center node in the overload state stops routing interactions to the contact center node from which the contact center node in the overload state claimed spare resources.

11. The distributed contact center system of claim 9, wherein the memory in each contact center node further stores instructions that, when executed by the processor of each of the contact center nodes, cause the processor to:
  include a type of the agent resources in the spare capacity message when the contact center node enters the spare capacity state and transmits the spare capacity message; and
  when the contact center node enters the overload state, select one of the other contact center nodes that sent a spare capacity message based on the type of agent resources in the sent spare capacity message and send the capacity request message to selected one of the other contact center nodes.

12. The distributed contact center system of claim 9, wherein instructions stored in memory that cause the processor to detect an overload state when utilization of agent resources is above a first threshold include instructions that cause the processor to detect the overload state based on a forecasting model for utilization of agent resources.

13. The distributed contact center system of claim 9, wherein instructions stored in memory that cause the processor to detect a spare capacity state when utilization of agent resources is below a second threshold include instructions that cause the processor to detect the spare capacity state based on a forecasting model for utilization of agent resources.

14. The distributed contact center system of claim 9, wherein the overload message, the spare capacity message, and the capacity request messages are sent to a master node of the plurality of contact center nodes and the acknowledgement message is sent by the master node, where the master node controls allocation of spare capacity to the plurality of contact center nodes.

15. The distributed contact center system of claim 14, where the master node includes instructions that cause the master node to allocate spare capacity to the plurality of contact center nodes on the basis of one or more of forecasting logic for forecasting consumption patterns based on historical events, calculation of additional network bandwidth consumption between the control center nodes due to routing interactions to control center nodes with spare capacity, geographic location of contact center nodes in the spare capacity state in relation to a geographic location of a contact center nodes in the overload state, and priority of access to spare capacity.

16. The distributed contact center system of claim 14, where the master node includes instructions that cause the master node to track allocation of spare capacity to the plurality of contact center nodes for cost allocation.

* * * * *